United States Patent [19]

Hidaka

[11] Patent Number: 5,452,411
[45] Date of Patent: Sep. 19, 1995

[54] SYSTEM AND METHOD FOR GENERATING GRAPHICS OBJECTS CONSTRAINED BY PREVIOUSLY GENERATED GRAPHICS OBJECTS

[75] Inventor: Kazuyoshi Hidaka, Yokohama, Japan

[73] Assignee: International Business Machines Corporation, Armonk, N.Y.

[21] Appl. No.: 200,835

[22] Filed: Feb. 22, 1994

Related U.S. Application Data

[63] Continuation of Ser. No. 807,349, Dec. 16, 1991, abandoned.

[30] Foreign Application Priority Data

Dec. 27, 1990 [JP] Japan .................................. 2-415177

[51] Int. Cl.6 ............................................. G06T 11/00
[52] U.S. Cl. .................................... 395/141; 395/138; 395/139; 395/133; 395/143
[58] Field of Search ................ 395/119, 120, 121, 125, 395/126, 127, 133, 138, 139, 140–143, 144, 148, 155, 161

[56] References Cited

U.S. PATENT DOCUMENTS

| | | | |
|---|---|---|---|
| 3,792,243 | 2/1974 | Appel et al. | 395/152 |
| 4,821,214 | 4/1989 | Sederberg . | |
| 4,912,657 | 3/1990 | Saxton et al. | 395/155 |
| 5,081,594 | 1/1992 | Horsley | 395/148 X |
| 5,297,057 | 3/1994 | Kramer et al. | 395/152 |

FOREIGN PATENT DOCUMENTS

| | | | |
|---|---|---|---|
| 0194442 | 2/1986 | European Pat. Off. | G06F 15/62 |
| 0205966 | 5/1986 | European Pat. Off. | G06F 15/72 |

OTHER PUBLICATIONS

*Eurographics '88. Proceedings of the European Computer Graphics Conference and Exhibition 1988*, "A System For Graphical Interaction On Parametrized Models", Van Emmerik, pp. 233–242.

*Primary Examiner*—Almis R. Jankus
*Attorney, Agent, or Firm*—Lawrence K. Stephens; Paul S. Drake

[57] ABSTRACT

A graphics system comprises a graphics object table that stores, for each graphics object, its identifier and the identifiers of one or more control points defining the graphics object; a control point table that stores, for each control point, its identifier and positional data which identifies the position of the control point relative to a graphics object. The graphics object table and the control point table are updated in response to the setting of one or more control points for a new graphics object by the user. These tables are referred to in response to a movement or reshaping of a primary graphics object, and the coordinate values of the affected control points are calculated by using a coordinate calculating unit.

14 Claims, 15 Drawing Sheets

| GRAPHICS OBJECT ID | CONNECTED GRAPHICS OBJECT ID |
|---|---|
| 31 | 33, 34 |
| 32 | 33, 34 |
| 33 | 31, 32 |
| 34 | 31, 32 |
FIG. 6 PRIOR ART
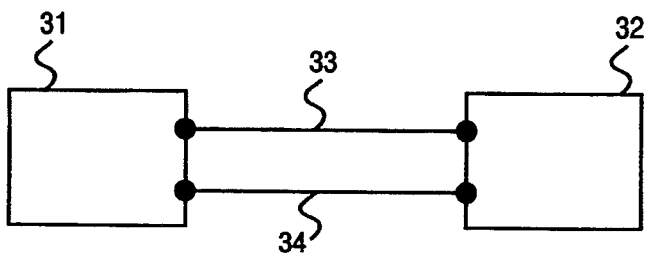
FIG. 7
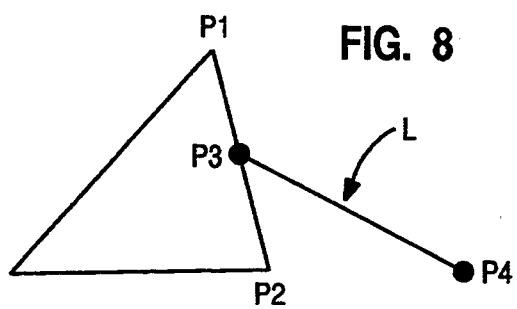
FIG. 8
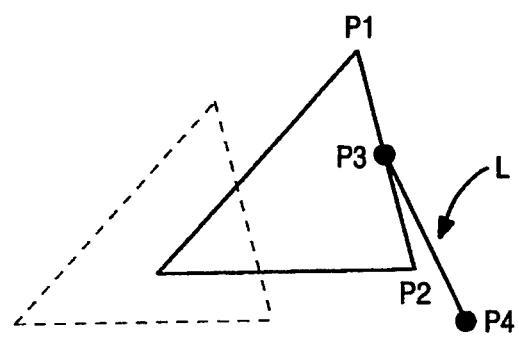
FIG. 9
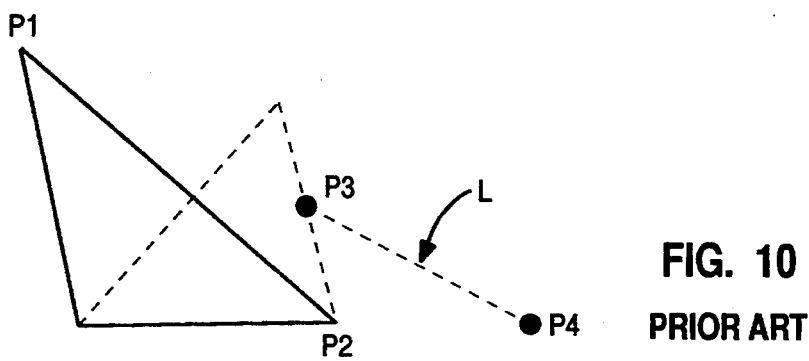
FIG. 10 PRIOR ART

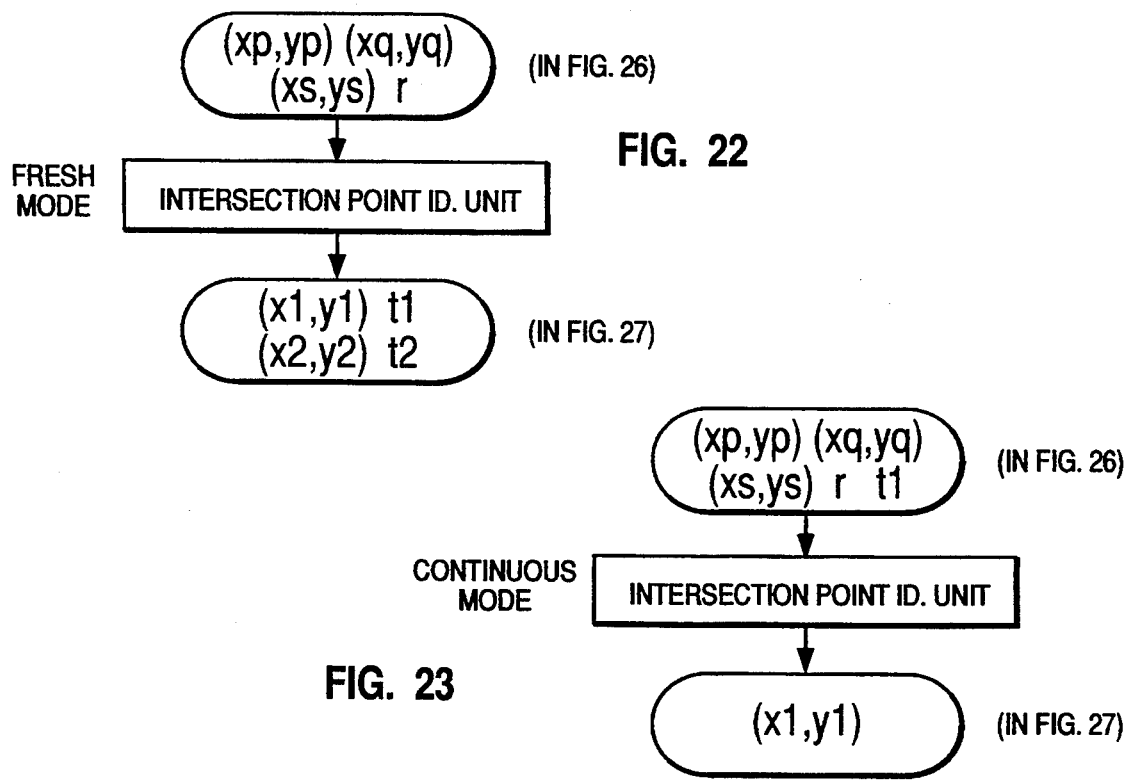
FIG. 22
FIG. 23
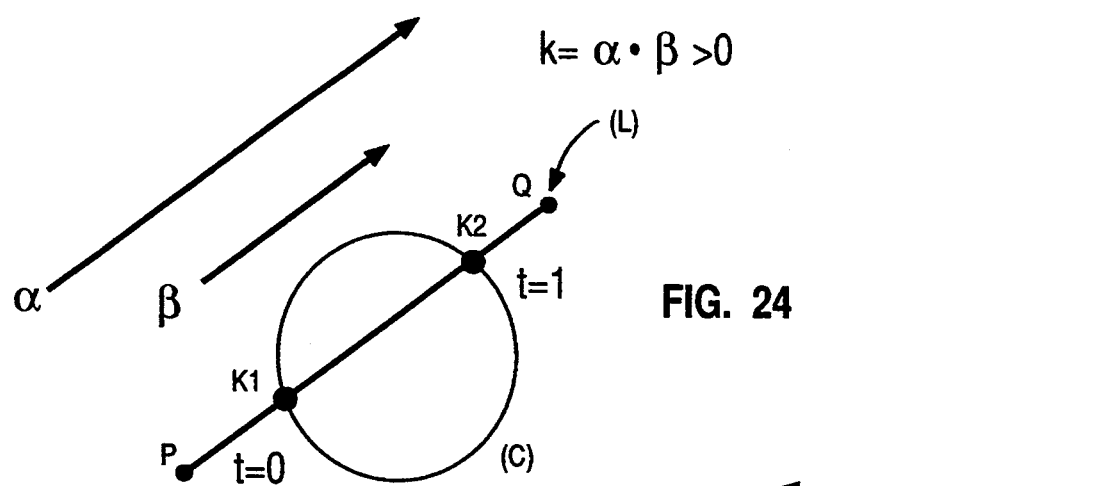
FIG. 24
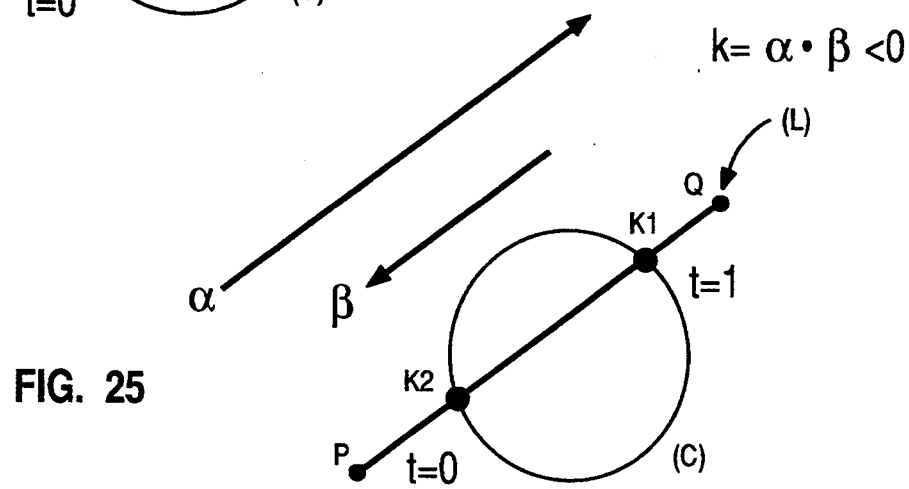
FIG. 25

SYSTEM AND METHOD FOR GENERATING GRAPHICS OBJECTS CONSTRAINED BY PREVIOUSLY GENERATED GRAPHICS OBJECTS

This is a continuation of application Ser. No. 07/807,349 filed Dec. 16, 1991, now abandoned.

BACKGROUND OF INVENTION

This invention relates to a system and a method for handling graphics objects, which generate a new graphics object geometrically constrained by a previously generated graphics object, and, when a graphics object is reshaped or moved, permit another graphics object generated under a geometrical constraint exerted directly or indirectly by the reshaped or moved graphics object to be redrawn in response to said reshaping or movement. Graphics objects include objects with dimensions from zero (points) to three (surfaces and so forth).

PRIOR ART

In many commercially available graphics object handling systems using a computer, points are set on a display screen in order to generate and display a graphics object. For instance, as shown in FIG. 1, to draw a segment, one must set its two ends. As shown in FIG. 2, to draw a circle, one must set the center of the circle and a point on its circumference. Such points defining a graphics object are called control points.

*PRIOR ART EXAMPLE 1

When a user intends to draw a new graphics object on a display screen, he often sets control points for the new graphics object while recognizing a geometric exerted by a graphics object that has previously been drawn. Hereafter, when a graphics object is generated in a geometric relation to a previously generated graphics object, the latter is called a primary graphics object relative to the former, and the former is called a secondary graphics object relative to the latter, for simplicity.

During the reshaping or the movement of a primary graphics object, however, commercially available prior art systems for handling graphics objects cannot redraw a secondary graphics object automatically in response.

For instance, when triangles ABC and DEF are located as shown in FIG. 3, to draw a segment L connecting vertices A and D, one may set control points for segment L upon points A and D. In this case, the triangles ABC and DEF are primary graphics objects, whereas segment L is a secondary graphics object. The control points for segment L are points A and D. When triangle ABC is reshaped (the position of point A is assumed to move), in the prior system, as shown in FIG. 4, segment L nevertheless remains in the original position, so that it is not redrawn to connect vertices A and D after triangle ABC has been reshaped.

*PRIOR ART EXAMPLE 2

As one solution to the problem, JA PUPA 1-246673 proposes a graphics object handling system in which, for each graphics object, identifiers of other graphics objects to be connected to the graphics object are stored in a memory, and, when one of the graphics objects is edited and changed, geometrical data on other graphics objects connected to it are modified in such a way that the connection between them is maintained. For example, as shown in FIG. 5, when segments 33 and 34 connected respectively to rectangles 31 and 32 are displayed, ID data on connected graphics objects are stored as shown in FIG. 6. If graphics object 32 is moved, geometrical data on graphics objects 33 and 34 connected to it are modified, and graphics objects 33 and 34 are redrawn so as to maintain the connection among graphics objects 32, 33, and 34 (FIG. 7). The system, however, involves the following problems:

(1) Since the above system stores only the IDs of other graphics objects to be connected as connection information, it may register that a graphics object has been redrawn, but is unable to determine which control point for said graphics object should have its coordinate values changed. Connections among graphics objects are not always as simple as those shown in FIG. 5. A single graphics object may be defined by a number of control points; a number of graphics objects may be connected to a single graphics object; or a number of graphics objects may be linked in a chain. In order to reflect a change in the position of a graphics object relative to other graphics objects, a technique for extracting affected control points is indispensable. The above system is deficient in this respect, and cannot propagate a change in the position of one of several intricately connected graphics objects to the others.

More specifically, in the example of FIG. 5, it is known that graphics objects 33 and 34 are changed in response to the movement of graphics object 32. However, the above publication discloses no specific method for determining which of control points e, f, g, and h for segments 33 and 34 should have its coordinates changed. If data on the coordinates of points e, f, g, and h and geometric data on object 32 are examined, it may be known that points g and h are located on the object 32, which means that their coordinates need to be changed. With this method, however, if objects 32 and 31 are connected indirectly via other objects and hence if the coordinates of points e and f also need to be changed, points e and f are not recognized as needing to be changed.

(2) The above system, which might be able to redraw a secondary object in response to the translation, rotation, magnification or reduction of a primary graphic object, cannot cope with other movements or reshaping. For instance, as shown in FIG. 8, assume that segment L has been drawn by selecting the midpoint P3 of side P1 P2 of a triangle and P4 as control points. If the triangle is translated, the new coordinates of its control points are determined by simply translating point P3. Therefore, even with the above system, it might be possible to redraw segment L (FIG. 9). If, however, the triangle is reshaped by moving the point P1 alone, as shown in FIG. 10, it is impossible to redraw segment L. This is because data on the intended new location of point P3 cannot be calculated from data on the movement of point P1 alone unless information on the relationship between side P1 P2 and point P3 are given.

SUMMARY OF THE INVENTION

In summary, the problems in the prior art stem from the fact that only the coordinate values of control points are given as their positional data. As a result, the system cannot calculate the new coordinate values of control points and therefore cannot redraw a secondary graphics object in response to the reshaping or the movement of a primary graphics object.

PROBLEMS TO BE SOLVED BY THE INVENTION

It is therefore an objective of the invention to provide a system and a method for handling graphics objects that can describe the positions of control points for a graphics object in a novel form that is not restricted to the coordinate values of control points.

Another objective of the invention is to facilitate operations for generating a graphics object that is geometrically constrained by another graphics object.

Another objective of the invention is to provide a graphics object handling system and method that describe the relationships between one graphics object and another not merely by means of their identifiers as in the prior art, but in a novel form.

A further objective of the invention is to permit a graphics object generated under a geometrical constraint exerted directly or indirectly by another graphic object to be redrawn in response to the movement or the reshaping of that other object while maintaining the constraint relationship between them, even when a number of graphics objects are intricately interrelated.

A still further objective of the invention is to permit a graphics object generated under a geometrical constraint exerted by a particular graphics object to be redrawn in response to a movement or reshaping of that other graphics object in a form other than translation, rotation, or scaling.

BRIEF DESCRIPTION OF THE DRAWINGS

FIG. 6 is an explanatory view of the connection information used in prior art example 2;

FIG. 7 is an explanatory view of how the graphics objects shown in FIG. 5 are reshaped according to prior art example 2;

FIG. 8 is an explanatory view of the graphics object reshaping permitted by prior art example 2;

FIG. 9 is a view of the graphics object reshaping permitted by prior art example 2;

FIG. 10 is an explanatory view of a problem in prior art example 2;

FIG. 22 is an explanatory view of a fresh mode of an intersection point identifying unit;

FIG. 23 is an explanatory view of a continuous mode of the intersection point identifying unit;

FIG. 24 is an explanatory view of the principle of identification of an intersection point;

FIG. 25 is an explanatory view of the principle of identification of an intersection point;

Figure 1:
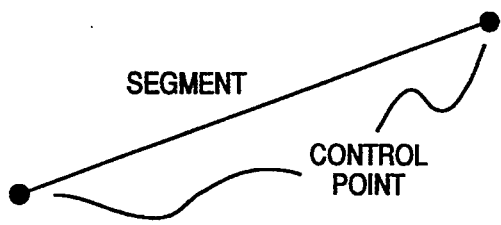
FIG. 1 is an explanatory view of the definition of a graphics object using control points.
Figure 2:
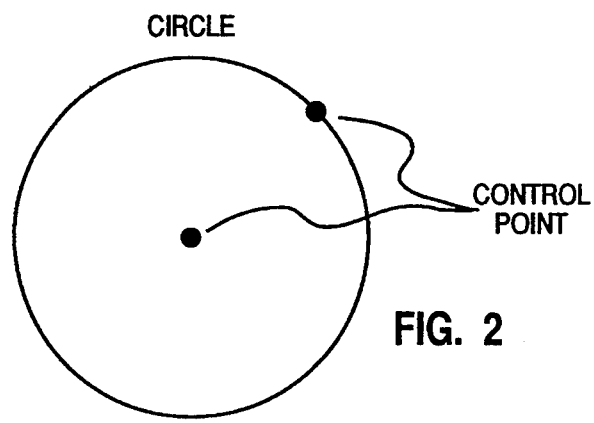
FIG. 2 is an explanatory view of the definition of a graphics object using control points.
Figure 3:
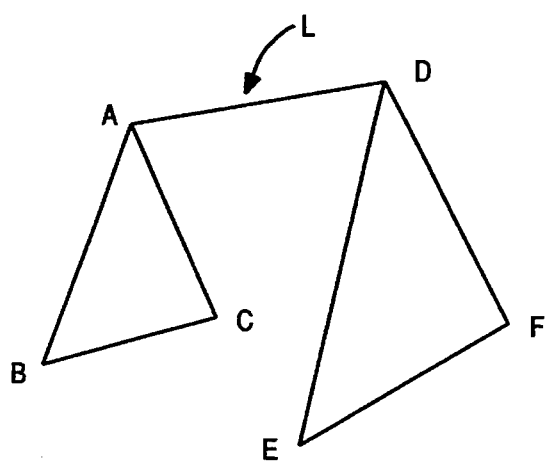
FIG. 3 is an explanatory view of prior art example 1.
Figure 4:
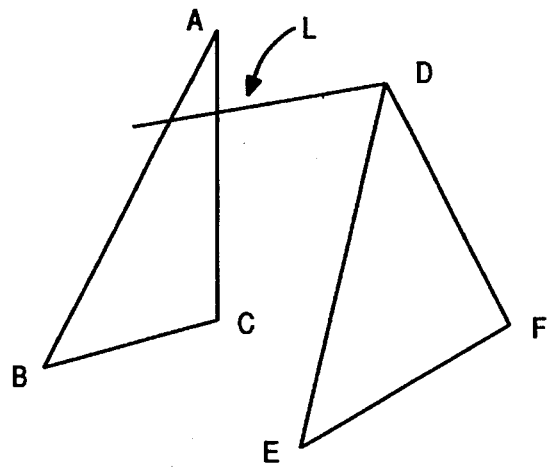
FIG. 4 is an explanatory view of a problem in prior art example 1.
Figure 5:
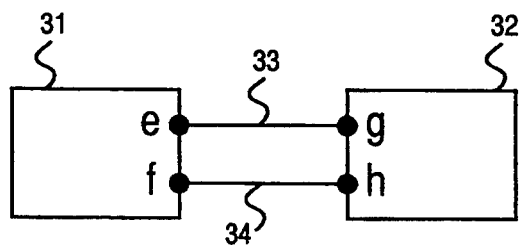
FIG. 5 is an explanatory view of prior art example 2.

EXPLANATION OF REFERENCE NUMERALS 10 graphics object table
11 control point table

DESCRIPTION OF THE PREFERRED EMBODIMENT

MEANS FOR SOLVING THE PROBLEM

The system according to the invention for generating a graphics object by setting one or more control points comprises:

(a) a graphics object table that stores, for each graphics object, its identifier and identifiers of one or more control points;

(b) a control point table that stores, for each control point, its identifier and positional data, the positional data being permitted to be data on the position of the control point relative to a graphics object; and (c) means of updating the graphics object table and the control point table in response to the setting of one or more control points for a new graphics object by a user.

The system may further comprise means for displaying a graphics object that has been or is being generated.

The data on the relative position of said control point are specifically as follows: First, if said control point is set upon a control point for a graphics object, they consist of the identifier of the control point. If said control point is set upon an intersection point defined by two graphics objects, they are the identifiers of the two graphics objects. If the graphics objects defining the intersection point are a quadratic curve and a line, or if both are quadratic curves, the identification data for the intersection point are included in them. If said control point is set upon an internal division point of an existing segment, they are the identifier of the segment object and the ratio of the internal division. If the control point is set upon a point of the circumference, they are the identifier of the circular object and an angle.

The system according to the invention for redrawing a graphics object generated under a geometrical constraint exerted directly or indirectly by another graphics object in response to the reshaping or movement of the latter, comprises:

(a) a graphics object table that stores, for each graphics object, its identifier and the identifiers of one or more control points;

(b) a control point table that stores, for each control point, its identifier and positional data, the positional data being permitted to be data on the position of the control point relative to a graphics object;

(c) means of referring to the graphics object table and the control point table, in response to the reshaping or movement of a graphics object in order to extract the identifiers of graphics objects that may have been generated under a geometrical constraint exerted directly or indirectly by the graphics object;

(d) means for calculating the coordinate values of control points which are for the extracted graphics objects and whose positional data are related to graphics objects, by utilizing said relative positional data; and (e) means for displaying a graphics object defined by a control point at least one calculated coordinate value of which is different from the original value.

EMBODIMENT

An embodiment of the invention is described below. For simplicity, the graphics object handling system according to the embodiment is assumed to make and display segments and circles by selecting one or more control points from among the five sorts of points on the screen that are shown in Table 1.

TABLE 1

| cp-type-1 | ordinary point on the screen | independent point having no relationship with any existing object on the screen |
| cp-type-2 | existing control point | control point such as vertex of an existing polygon, end of a line, or center of a circle |
| cp-type-3 | intersection | intersection defined by an existing line, circle, and so forth |
| cp-type-4 | internal division point | point dividing an existing line by a specific ratio |
| cp-type-5 | point on a circumference | point located on a circumference and moved along it at a specific angle to a horizontal line on the screen |

Figure 11:
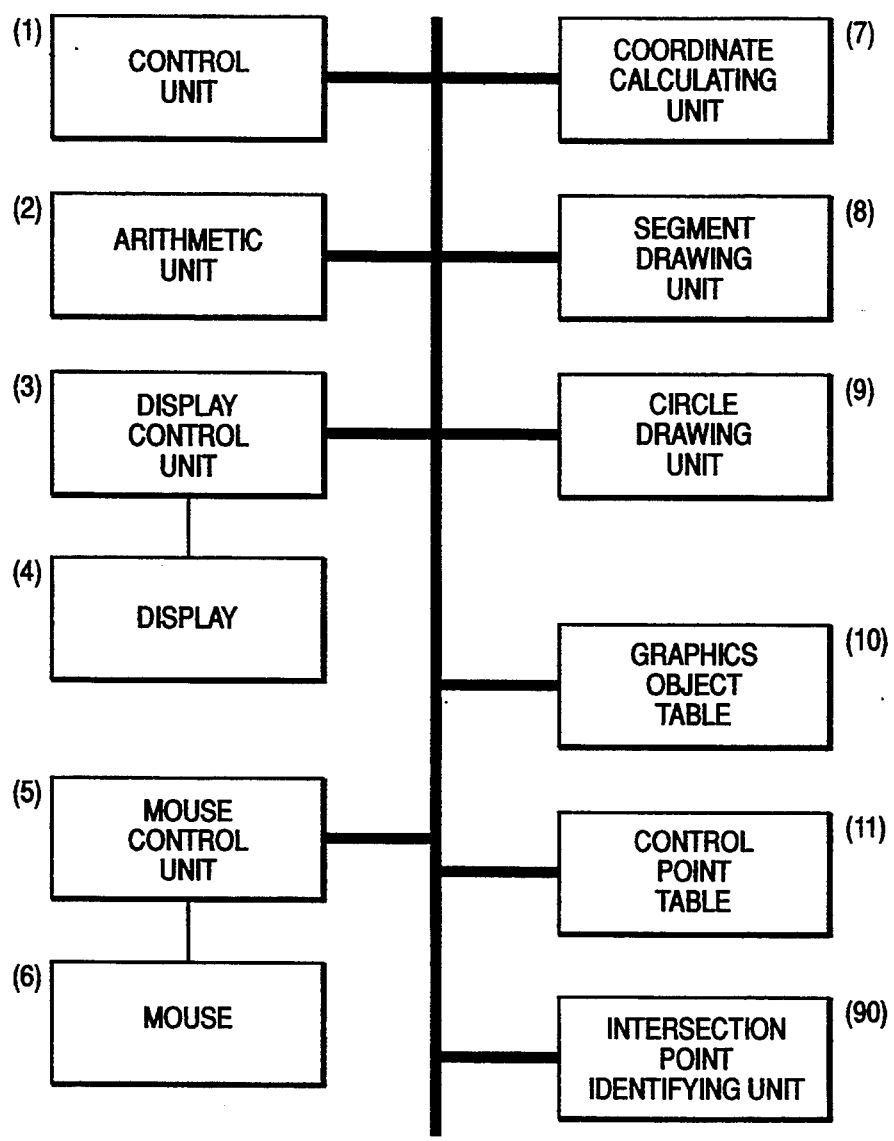
FIG. 11 is a block diagram showing the components of an embodiment of the invention.

As shown in FIG. 11, an example of a graphics object handling system designed according to the invention includes a control unit (1), arithmetic unit (2), display control unit (3), display (4), mouse control unit (5), mouse (6), coordinate calculating unit (7), segment drawing unit (8), circle drawing unit (9), graphics object table (10), control point table (11), and intersection point identifying unit (90). The control unit (1) performs overall control. The required calculation is done by the arithmetic unit (2). Control of the display (4) and mouse (6) is exerted, respectively, by the display control unit (3) and mouse control unit (5). Tables (10) and (11) are generated in a memory, and the reading of data to and from them is controlled directly by the control unit (1). Units (3), (5), (7), (8), (9), and (90) may be implemented by hardware for specific purposes, or in the form of software modules.

Figure 12:
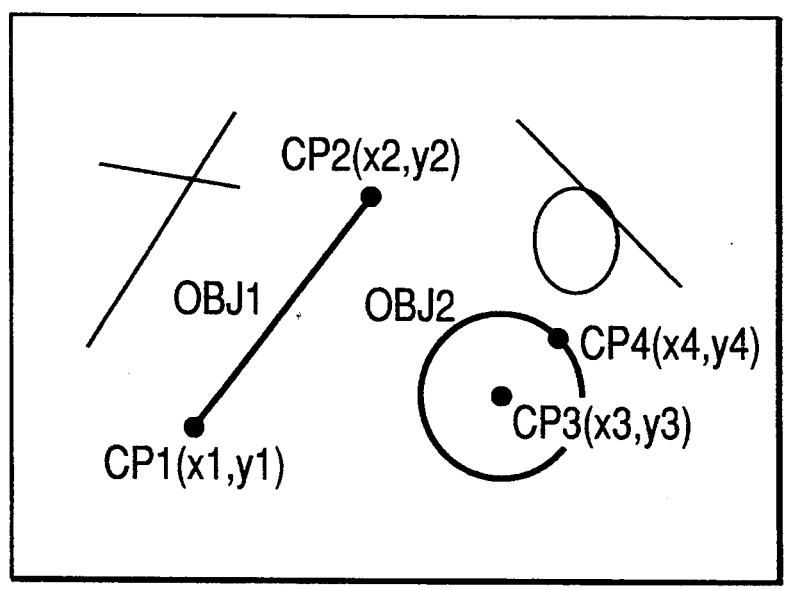
FIG. 12 is a view showing an example of graphics objects handled by the embodiment.

All graphics objects drawn on the screen of the display (4) are numbered and registered in the graphics object table (10). As shown in Table 2, the items for control points registered in the graphics object table (10) are "object number," "type," which determines the object to be a segment, circle, or something else, and "control point number" of one or more control points that define the object. Table 2 shows the contents of the graphics object table (10) when a segment (object number: OBJ1) and a circle (object number: OBJ2) shown in FIG. 12 are displayed on the display screen.

TABLE 2

| GRAPHICS OBJECT TABLE | | |
| --- | --- | --- |
| Object Number | Type | Control Point Number |
| ... | ... | ... |
| OBJ1 | Segment | CP1, CP2 |
| ... | ... | ... |
| OBJ2 | Circle | CP3, CP4 |
| ... | ... | ... |

The control point table (11) manages all control points that define graphics objects on the screen. Table 3 shows the contents of the control point table when the four control points CP1 to CP4 in FIG. 12 are all cp-type-1, that is, ordinary points on the screen. Another example of a control point table is shown in Table 4. As shown below, the number and contents of the items for control points vary according to the types of the control points in Table 1. A process for generating Tables 3 and 4 is referred to later.

TABLE 3

| CONTROL POINT TABLE (EXAMPLE 1) | | | | | |
| --- | --- | --- | --- | --- | --- |
| Control Point Number | Control Point Item 1 (type) | Control Point Item 2 (coordinate value) | Control Point Item 3 | Control Point Item 4 | Control Point Item 5 |
| ... | ... | ... | ... | ... | ... |
| CP1 | cp-type-1 | (x1, y1) | ... | ... | ... |
| CP2 | cp-type-2 | (x2, y2) | ... | ... | ... |
| CP3 | cp-type-3 | (x3, y3) | ... | ... | ... |
| CP4 | cp-type-4 | (x4, y4) | ... | ... | ... |
| ... | ... | ... | ... | ... | ... |

TABLE 4

| CONTROL POINT TABLE (EXAMPLE 2) | | | | | |
| --- | --- | --- | --- | --- | --- |
| Control Point Number | Control Point Item 1 (type) | Control Point Item 2 (coordinate value) | Control Point Item 3 | Control Point Item 4 | Control Point Item 5 |
| ... | ... | ... | ... | ... | ... |
| CP11 | cp-type-1 | (x11, y11) | ... | ... | ... |
| ... | ... | ... | ... | ... | ... |
| CP12 | cp-type-2 | (x11, y11) | CP11 | ... | ... |
| ... | ... | ... | ... | ... | ... |

TABLE 4-continued

CONTROL POINT TABLE (EXAMPLE 2)

| Control Point Number | Control Point Item 1 (type) | Control Point Item 2 (coordinate value) | Control Point Item 3 | Control Point Item 4 | Control Point Item 5 |
| --- | --- | --- | --- | --- | --- |
| CP13 | cp-type-3 | (x13, y13) | OBJ3 | OBJ4 | TO |
| ... | ... | ... | ... | ... | ... |
| CP14 | cp-type-4 | (x14, y14) | OBJ5 | ratio1 | ... |
| ... | ... | ... | ... | ... | ... |
| CP15 | cp-type-5 | (x15, y15) | OBJ6 | theta1 | ... |
| ... | ... | ... | ... | ... | ... |

When a control point number is entered, the coordinate calculating unit (7) uses the number as a key to obtain from the control point table (11) a value indicating the type of the control point, and calculates and outputs the coordinate value of the control point on the screen according to its type. The operations of the unit are explained in detail later.

Figure 13:
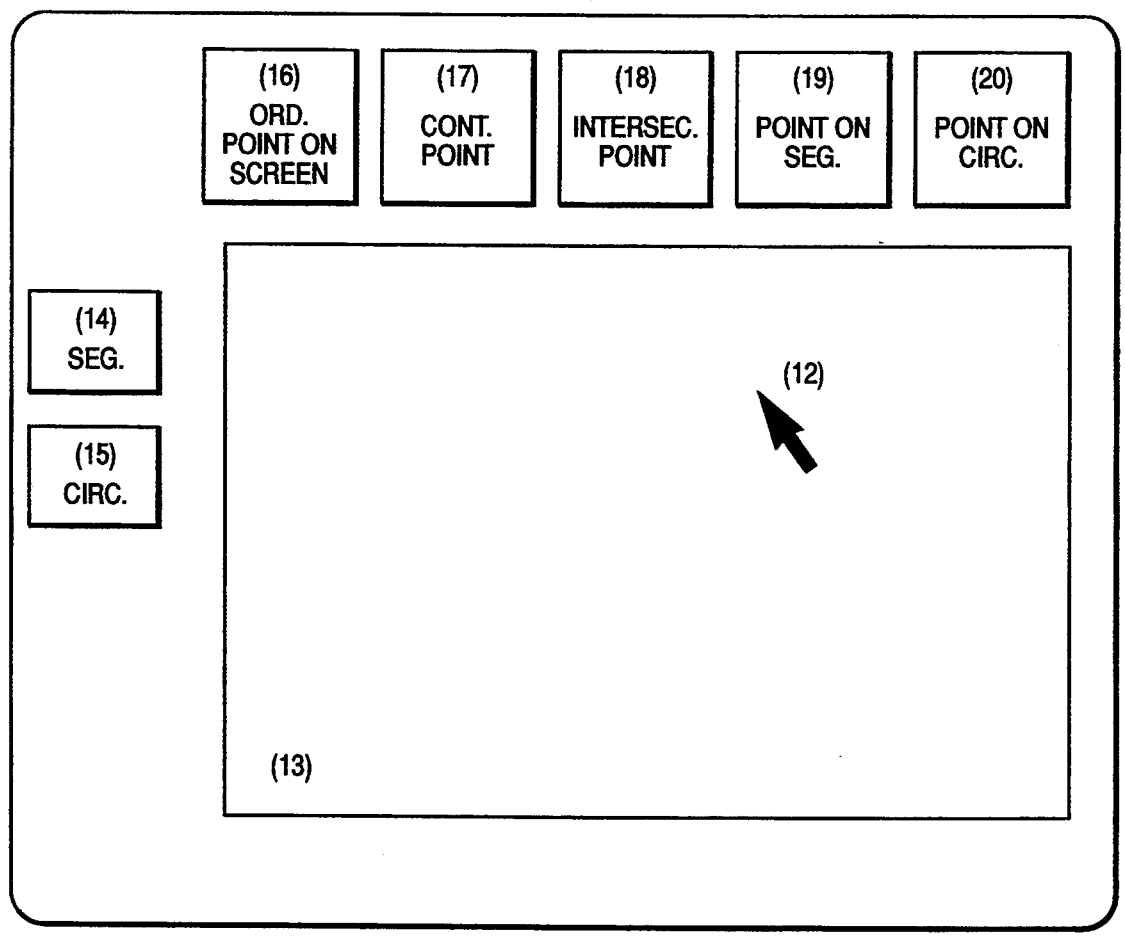
FIG. 13 is a view showing a display screen of the embodiment during operation.

FIG. 13 shows the screen of the display (4) when the graphics object handling system is activated. The operation screen may be designed in various ways; FIG. 13 shows one example. Reference number (12) refers to a mouse cursor that moves in accordance with the movement of the mouse (6), (13) a display area on which graphics object are displayed, (14) a button area for drawing segments, (15) a button area for drawing circles, and (16) to (20) button areas for designating the type of a control point.

The object generating function provided by the embodiment is explained below. First, an example in which the graphics objects OBJ1 and OBJ2 shown in FIG. 12 are generated and displayed in the display area (13) is explained. Examples of procedures for generating and drawing these graphics objects according to the operation screen shown in FIG. 13 are as follows:

(i) Procedure for drawing a segment CP1–CP2:

LS-1 When the mouse (12) is clicked on a button area (14), the system enters into the mode for drawing a segment.

LS-2 A temporary point (TP1) is displayed on the screen. The user moves it to a target position in the display area (13) by moving the mouse (6) while pressing the mouse button, a combined action which is hereinafter called dragging.

LS-3 When the mouse is clicked on a button area (16), the current coordinate value of TP1 is determined to be the coordinate value of a control point. The number CP1 is given to the control point. In this embodiment, a number indicating the setting order is assigned as a control point number.

LS-4 The value cp-tp-1, indicating that CP1 is an ordinary point on the screen, is registered as item 1 of the control point table for the control point number CP1, and the determined coordinate values are registered as item 2 (see Table 3).

LS-5 A temporary point (TP2) is displayed on the screen. The user moves it to a target position in the display area (13) by dragging it with the mouse. Meanwhile, the temporary segment CP1 TP2 may be displayed in the display area (13).

LS-6 When the mouse is clicked on a button area (16), the current coordinate values of TP2 are determined to be the coordinate values of the new control point. The new control point is assigned the control point number CP2.

LS-7 The value cp-type-1, indicating that CP2 is an ordinary point on the screen, is registered as item 1 of the control point table for the control point number CP2, and the determined coordinate values are registered as item 2 (see Table 3). Generation of the segment is then completed. In this embodiment, a number indicating the order of generation is given to the graphics object.

LS-8 OBJ1 is registered in the "object number" column of the graphics object table (10), a value indicating the object is a segment is registered in the "type" column, and CP1 and CP2 are registered in the "control point number" column (see Table 2).

LS-9 The coordinate values of CP1 and CP2 are transferred to the segment drawing unit (8), and a segment whose ends are CP1 and CP2 is displayed in the display area (13). Since the method for generating pixel data in order to display the segment is known, its explanation is omitted.

(ii) Procedure for drawing a circle with point CP3 as its center and point CP4 on its circumference:

CS-1 When the mouse is clicked on a button area (15), the system enters into the mode for drawing a circle.

CS-2 A temporary point (TP1) is displayed on the screen. The user moves it to a target position in the display area by dragging it with the mouse.

CS-3 When the mouse is clicked on a button area (16), the current coordinate values of TP1 are determined to be the coordinate values of the new control point. Control point number CP3 is given to the new control point.

CS-4 The value cp-type-1, indicating that CP3 is an ordinary point on the screen, is registered as item 1 of the control point table for the control point number CP3 in the control point table, and the determined coordinate values are registered as item 2 (see Table 3).

CS-5 A temporary point (TP2) is displayed on the screen. The user moves it to a target position in the display area (13) by dragging it with the mouse. Meanwhile, a temporary circle having point CP3 as its center and point TP2 on its circumference may be displayed in the display area (13).

CS-6 When the mouse is clicked on the button area, the current coordinate value of TP2 is determined to be the coordinate value of the new control point. Control point number CP4 is given to the new control point.

CS-7 The value cp-type-1, indicating that CP4 is an ordinary point on the screen, is registered as item 1 of the control point table for the control point number CP4, and the determined coordinate values are registered as item 2 (see Table 3).

CS-8 OBJ2 is registered in the "object number" column of the graphics object table (10), a value indicating that it is a circle is registered in the "type" column, and CP3 and CP4 are registered in the "control point number" column (see Table 2).

CS-9 The coordinate values of CP3 and CP4 are transferred to the circle drawing unit (9), and a circle with CP3 as its center and CP4 on its circumference is displayed in the display area. Since the method for generating pixel data in order to display the circle is known, its explanation is omitted.

In the foregoing procedures for drawing a segment, a control point may be set in a geometric relation to an existing graphics object. This is performed as explained below. Steps LS-2, 3 and 4 are discussed as examples.

*A control point is set on an existing control point.

Figure 14:
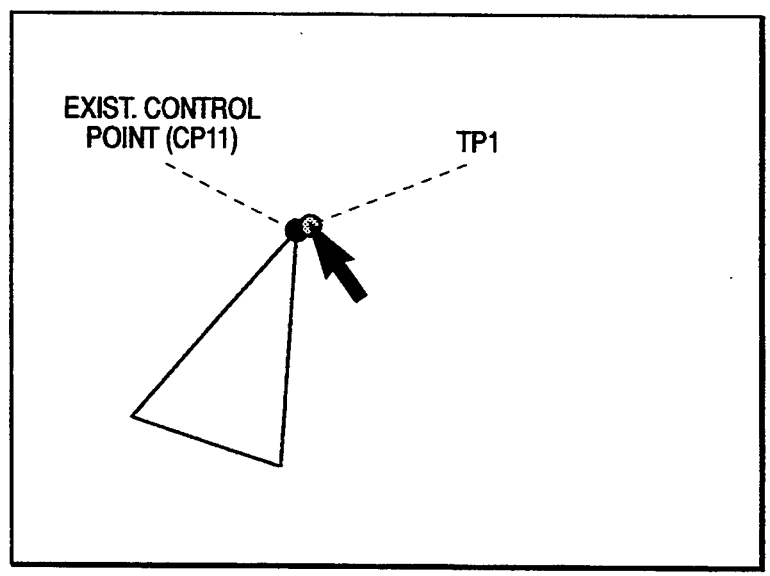
FIG. 14 is a view showing an example of how a secondary graphics object is made.

LS-2-1 As shown in FIG. 14, the user drags TP1 with the mouse and places it on an existing control point.

LS-3-1-1 The user clicks the mouse on a button area (17).

Figure 15:
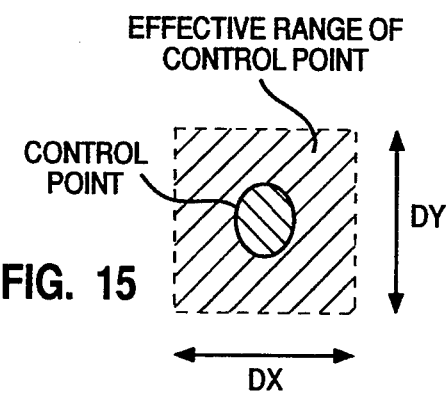
FIG. 15 is an explanatory view of a control point effective range.

LS-3-1-2 An existing control point that has TP1 in its effective range is selected. The effective range of a control point is a rectangular area with the control point as its center, transverse dimension DX, and longitudinal dimension DY (see FIG. 15). In this embodiment, it is assumed that the effective ranges are constant in size for all control points. Therefore, no item for describing the effective range of a control point is needed in the control point table. If the user wants the effective range of the control point to be variable, an item for registering the effective ranges set by the user must be provided in the control point table. Here, assume that control point CP11 has been selected from the control point table. CP11 is a point defining a triangle T1.

LS-4-1 A number, CP12, is given to a new control point and the value cp-type-2 of its control point type is registered as item 1. The coordinate values (x11, y11) of the control point CP11 selected in LS-3-1-2 are registered in item 2 as the coordinate values of the control point CP12. The control point number CP11 is registered as item 3 (see Table 4).

Figure 16:
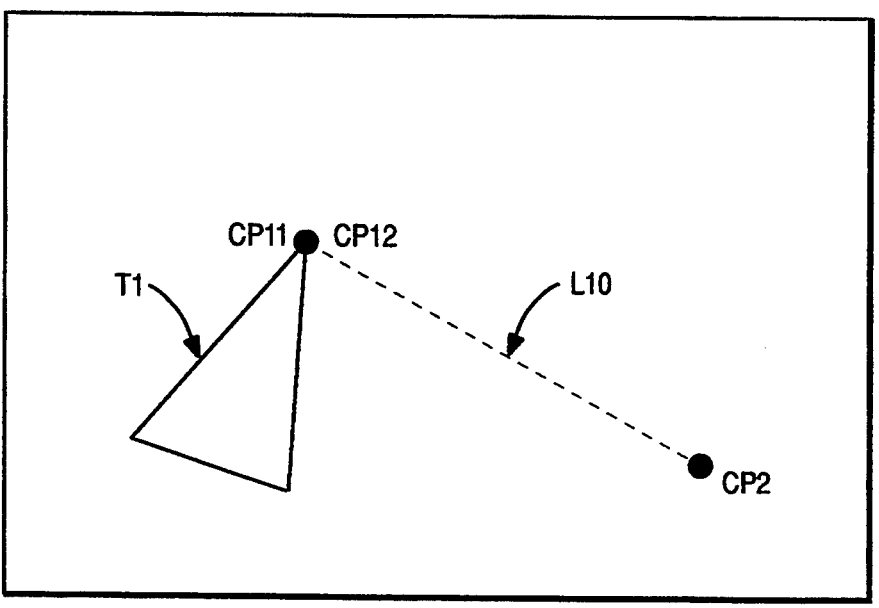
FIG. 16 is a view showing an example of how a secondary graphics object is made.

After steps LS-5 to LS-9 have been executed, the segment L10 connecting point CP12 and point CP2 shown in FIG. 16 is displayed. *A control point is set on a point of intersection of existing graphics objects.

Figure 17:
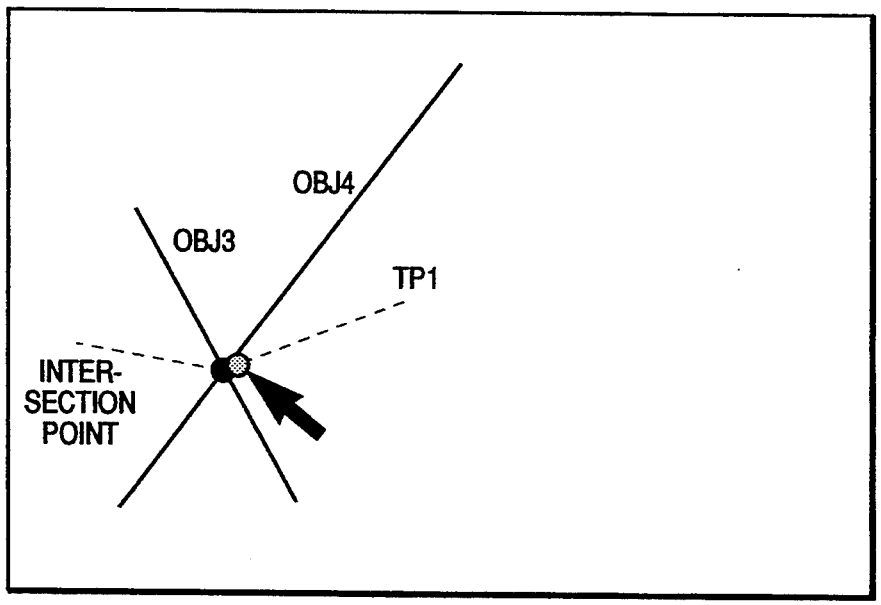
FIG. 17 is a view showing an example of how a secondary graphics object is made.

LS-2-2 TP1 is dragged with the mouse and placed on a point of intersection of existing graphics objects (see FIG. 17).

LS-3-2-1 The user clicks the mouse button (18).

LS-3-2-2 For each possible pair of existing objects, the system checks whether the two objects forming the pair have an intersection point. If so, the coordinate values of the intersection point and the numbers of the two objects are registered in the intersection point table (Table 5). If the point is formed by an intersection of a circle and a segment, or of two circles, the intersection point identifying unit (90), which will be explained later, is used, and the coordinate values and a characteristic value output from the unit are registered in the intersection point table.

Figure 18:
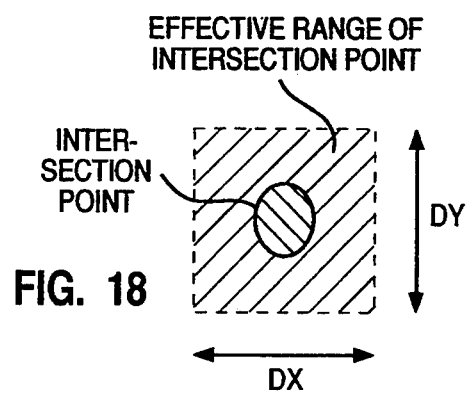
FIG. 18 is an explanatory view of an intersection point effective range.

LS-3-2-3 An intersection point having TP1 in its effective range is selected from the intersection point table. The effective range of an intersection point is a rectangular area with the intersection point as its center, transverse dimension DX, and longitudinal dimension DY (see FIG. 18). In this embodiment, the effective ranges are assumed to be constant for all intersection points. Therefore, no item for describing the intersection point effective range is needed in the intersection table.

LS-3-2-4 The selected intersection point is determined to be a new control point. It is given a control point number CP13.

LS-4-2 The value cp-type-3 of the type of control point CP13 is registered as item 1. The coordinates of the intersection point selected in LS-3-2-3 are registered as item 2. The object numbers (OBJ3 and OBJ4) of the two objects defining the intersection point are registered as items 3 and 4. Further, in response to at least one of the two objects being a circle, the characteristic value T0 of the intersection point is registered as item 5 (see Table 4). The characteristic value is known from the intersection table.

Figure 19:
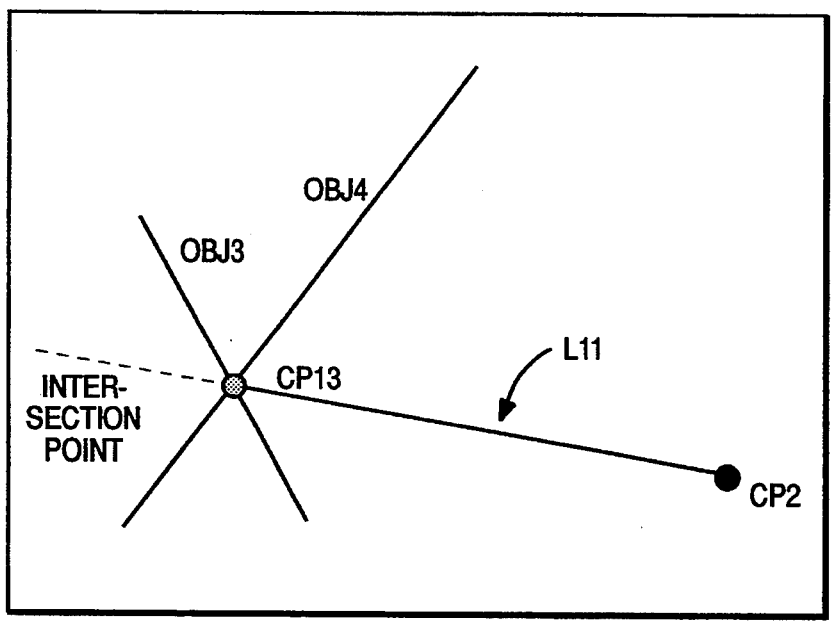
FIG. 19 is an explanatory view showing an example of how a secondary graphics object is made.

After steps LS-5 to LS-9 have been executed, the segment L11 connecting the points CP13 and CP2 shown in FIG. 19 is displayed.

Figure 20:
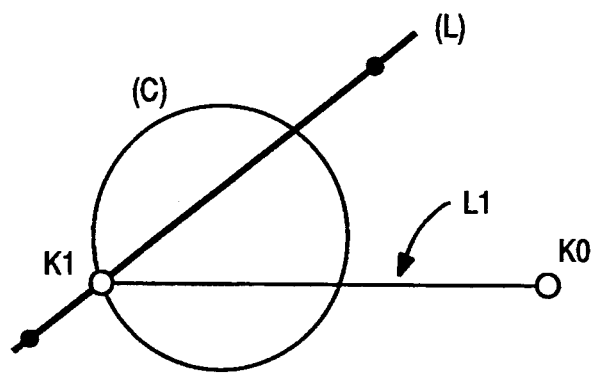
FIG. 20 is a view showing a point of intersection of a circle and a segment.
Figure 21:
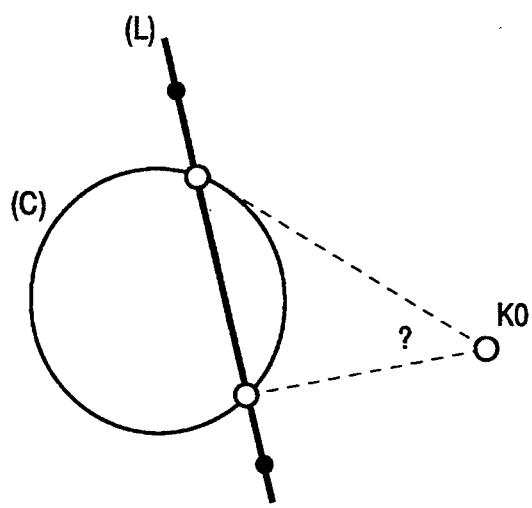
FIG. 21 is an explanatory view of a problem that occurs when a control point is a point of intersection of a circle and a segment.

The intersection point identifying unit (90) is now explained. As shown in FIG. 20, a segment (L) and a circle (C), in general, have two intersection points. Two circles also generally have two intersection points. Assume that segment L1 has been drawn as a secondary graphics object by setting control point K1 upon one of the two intersection points in FIG. 20 and control point K0 upon a point other than an intersection. Assume also that segment (L) and circle (C) have been moved as shown in FIG. 21. In this case, unless it can be determined which of the two newly formed intersection points is the result of the movement of K1, segment L1 cannot be redrawn. However, the use of the intersection point identifying unit (90) makes it possible to identify and track two intersection points defined by a segment and a circle. Therefore, in FIG. 21, it is possible to determine which of the two intersection points corresponds to K1, and to redraw segment L1.

The operations of the intersection point identifying unit (90) are as follows:

(I) In the fresh mode, when the coordinate values of two points defining a segment L and the equation of a circle (C) (the coordinate values of its center and its radius may be sufficient) are entered, the unit outputs the coordinate values of two intersection points and characteristic values corresponding to them (see FIG. 22).

TABLE 5

INTERSECTION POINT TABLE

| Intersection Number | Object Number | Object Number | Coordinates | Characteristic Value |
|---|---|---|---|---|
| ... | ... | ... | ... | ... |
| 1k-2 | OBJkm-2(L) | OBJkn-2(L) | (xk-2, yk-2) | ... |
| 1k-1 | OBJkm-1(L) | OBJkn-1(L) | (xk-1, yk-1) | ... |
| 1k | OBJkm (L) | OBJkn (C) | (xk, yk) | Tk |
| 1k + 1 | OBJkm + 1(C) | OBJkn + 1(L) | (xk + 1, yk + 1) | Tk + 1 |
| 1k + 2 | OBJkm + 2(L) | OBJkn + 2(C) | (xk + 2, yk + 2) | Tk + 2 |
| ... | ... | ... | ... | ... |

Note:
(L) means a segment, and (C) means a circle.

(II) In the continuous mode, when the coordinate values of two points defining a segment L, the equation of a circle (C) (the coordinates of its center and its radius alone may be sufficient), and a characteristic value are entered, the unit outputs the coordinate values of the intersection point corresponding to the characteristic value (see FIG. 23).

Described below is a method for distinguishing two solutions of simultaneous equations, that is, two intersection points, by using characteristic values. This method constitutes the fundamental portion of the operation. The embodiment discriminates two intersection points by using the sign of the inner product of vectors.

As shown in FIG. 24, the ends of a segment (L) are named P and Q, and the points of intersection with a circle (C) K1 and K2. Vector $\alpha$ is defined by P→Q, and vector $\beta$ by K1→K2. A characteristic value t intrinsic to each intersection point is discussed. The characteristic value t may be 0 or 1. The inner product of vectors $k = \alpha \times \beta$ is calculated, and if $k > 0$, the characteristic value t of intersection point K1 is defined as 0, and the characteristic value t of intersection point K2 as 1 (see FIG. 24). If $k < 0$, the characteristic value t of intersection point K1 is defined as 1, and the characteristic value t of intersection point K2 as 0 (see FIG. 25). Since $\alpha$ and $\beta$ are always parallel, examining the sign of their inner product is equivalent to examining whether the directions of the two vectors are the same or opposite. As can been seen from FIGS. 24 and 25, whichever of the two intersection points may be called K1, the characteristic value t of the intersection point nearer to P is defined as 0, and the characteristic value t of the intersection point nearer to Q as 1.

Even if the original graphics objects (L) and (C) are moved or reshaped, it is possible to distinguish which of two newly generated intersection points corresponds to which original intersection point, because one intersection point is thus identified by means of the characteristic value. Specifically, it is sufficient to solve the changed simultaneous equations for (L) and (C) and to select one of the two solutions that has the same characteristic value. Since this method merely examines the sign of an inner product of vectors, it is very efficient for identifying an intersection point.

The calculation of intersection points and definition of characteristic values are now described in more detail. If an xy coordinate system is set on a screen, a straight line (A) connecting two points P (xp, yp) and Q (xq, yq) is expressed by the following equation:

$$(yp-yq)*x+(xq-yp)*y+(xp*yq-xq*yp)=0 \quad (F1)$$

A circle (C) having a point S(xs, ys) as its center and a radius r is expressed by the following equation:

$$(x-xs)2+(y-ys)2=r**2 \quad (F2)$$

where **2 indicates that the value is squared.

Figure 26:
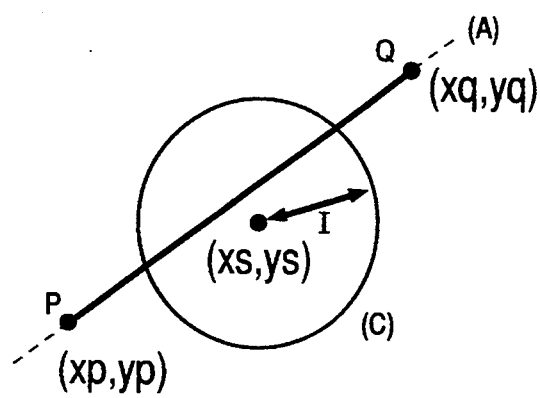
FIG. 26 is an explanatory view of the operation of the intersection point identifying unit.
Figure 27:
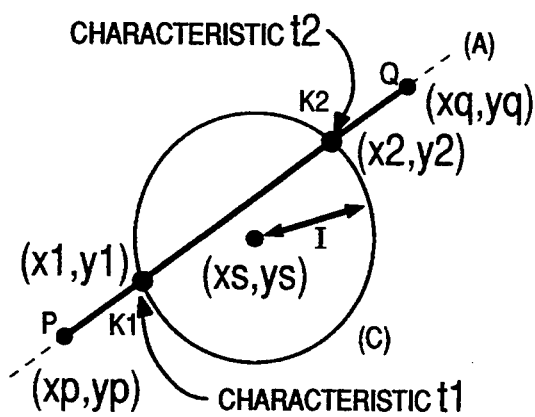
FIG. 27 is an explanatory view of the operation of the intersection point identifying unit.

The values of xp, yp, xq, yq, xs, ys, and r are determined when the straight line and the circle are drawn (see FIG. 26). The intersection point identifying unit (90) solves simultaneous equations (F1) and (F2), and obtains x−y values, (x1, y1) and (x2, y2), that simultaneously satisfy the two equations. These two solutions are the coordinates of the intersection points K1 and K2 of straight line (A) and circle (C) (see FIG. 27).

Two two-dimensional vectors $\alpha$ and $\beta$ are now discussed. $\alpha$ is the vector from point P to point Q on straight line (A), and is directed from P to Q. $\beta$ is the vector from K1 to K2, and is directed from K1 to K2. The components of $\alpha$ and $\beta$ are expressed as follows:

$$\alpha = (xq-xp, yq-yp)$$

$$\beta = (x2-x1, y2-y1)$$

The inner product k of $\alpha$ and $\beta$ is:

$$k = \alpha * \beta * \cos(\theta) \quad (F3)$$

-continued
$$= (xq - xp) * (x2 - x1) + (Yq - yp) * (y2 - y1)$$

Since K1 and K2 are located on straight line (A), $\alpha$ and $\beta$ are always parallel and $\cos(\theta)$ always takes the value 1 or −1. Therefore, by calculating the value of inner product k from (F3) and examining its sign, the value of $\cos(\theta)$ can be determined. That is, it can be definitely determined whether the direction of $\beta$ is the same as or opposite to that of $\alpha$. The sign of k determines the characteristic value t, which takes the value 0 or 1. If $k > 0$, the characteristic value t of intersection point K1 is defined as 0, and the characteristic value t of intersection point K2 as 1 (see FIG. 24). If $k < 0$, the characteristic value t of intersection point K1 is defined as 1, and the characteristic value t of intersection point K2 as 0 (see FIG. 25).

In the fresh mode, the coordinates (x1, y1) and (x2, y2) of two intersection points and their characteristic values obtained in the foregoing process are output. In the continuous mode, the coordinates (x1, y1) and (x2, y2) of two intersection points and their characteristic values are obtained in the foregoing process, and the coordinates of whichever of these intersection points has the same characteristic value as the entered one are output.

The foregoing description has been directed to a case in which the intersection points are defined by a circle and a segment. This vector approach may be applied to identifying a point of intersection of two circles. That is, the embodiment distinguishes two intersection points by using the sign of one component of the outer product of vectors.

Figure 28:
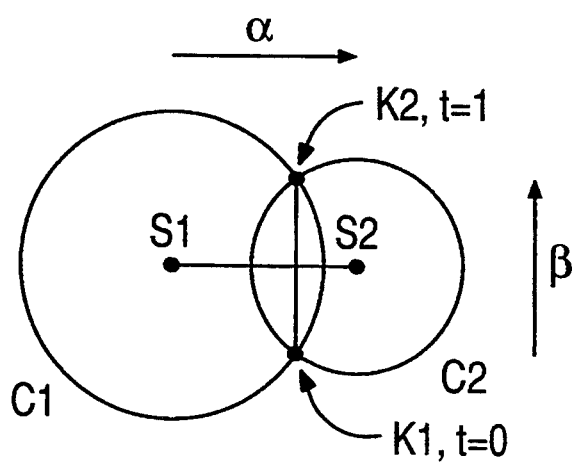
FIG. 28 is an explanatory view of the principle of identification of an intersection point.
Figure 29:
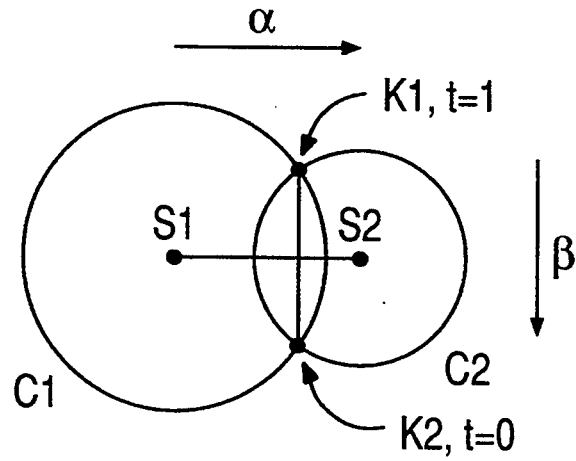
FIG. 29 is an explanatory view of the principle of identification of an intersection point.

As shown in FIG. 28, the centers of circles C1 and C2 are named S1 and S2, respectively, and the two intersection points of the circles K1 and K2, respectively. Vector $\alpha$ is defined by P→Q, and vector $\beta$ by K1→K2. The plane encompassing the two vectors is assumed to be an xy plane. Further, the characteristic value t intrinsic to each intersection point is discussed. The characteristic value t may be 0 or 1. The outer product $k = \alpha \times \beta$ is calculated. If its z component $kz > 0$, the characteristic value t of intersection point K1 is defined as 0, and the characteristic value t of intersection point K2 as 1 (see FIG. 29). If $kz < 0$, the characteristic value t of intersection point K1 is defined as 1, and the characteristic value t of intersection point K2 as 0 (see FIG. 30). Since $\alpha$ and $\beta$ are always orthogonal, examining the sign of their outer product is equivalent to examining whether intersection point K1 or K2 is located to the right or left as viewed from the center S1. As can been seen in FIGS. 29 and 30, whichever of the two intersection points is called K1, the characteristic value t of the intersection point located to the right as viewed from center S1 is defined as 0, and the characteristic value t of the intersection point located to the left as 1. In this fashion, two intersection points defined by two circles can be identified.

Now the discussion returns to an explanation of the procedure for setting a control point in a geometric relation to an existing graphics object.

*A control point is set on an internal division point of an existing segment.

Figure 30:
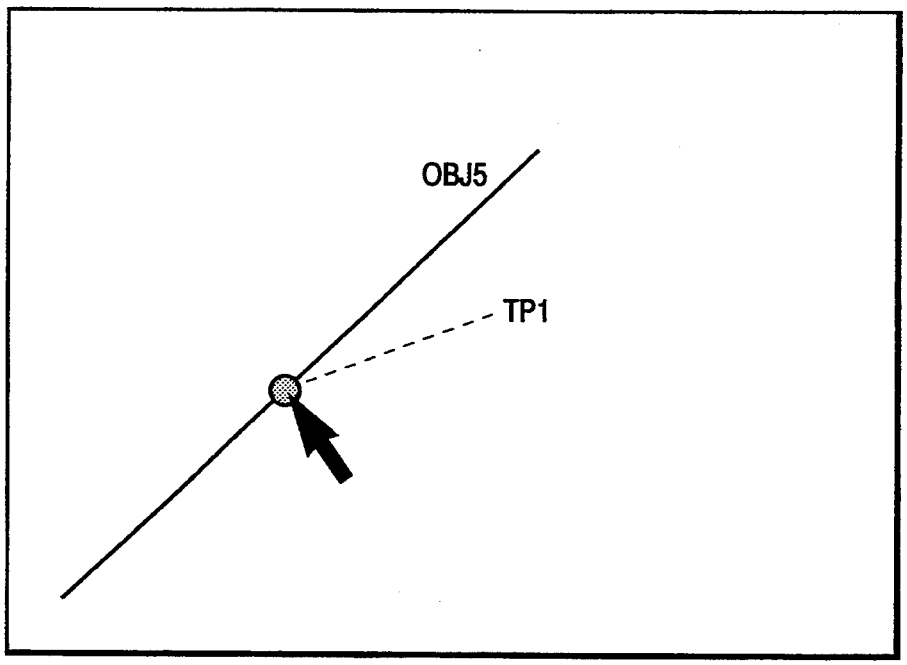
FIG. 30 is a view showing an example of how a secondary graphics object is made.

LS-2-3 TP1 is dragged with the mouse and placed on a target existing segment whose object number is OBJ5 (see FIG. 30).

LS-3-3-1 When the mouse is clicked on a button area (19), the system enters the mode permitting the user to select a point on a segment by using, for example, the means disclosed in Japanese Patent Application 2-226812. The selected point is determined to be a new control point, and is given the number CP14.

LS-3-3-2 The ratio of internal division ratio 1 is calculated from the coordinates of the selected point and the coordinates of the ends of segment OBJ5. If the selected point is a midpoint, the resultant in ratio 1 is 0.5.

LS-4-3 The value cp-type-4 of the type of control point CP14 is registered as item 1. The coordinates of the internal division point are registered as item 2, the object number OBJ5 of the segment the on which internal division point is located is registered as item 3, and the ratio of the internal division, ratio 1, is registered as item 4 (see Table 4).

Figure 31:
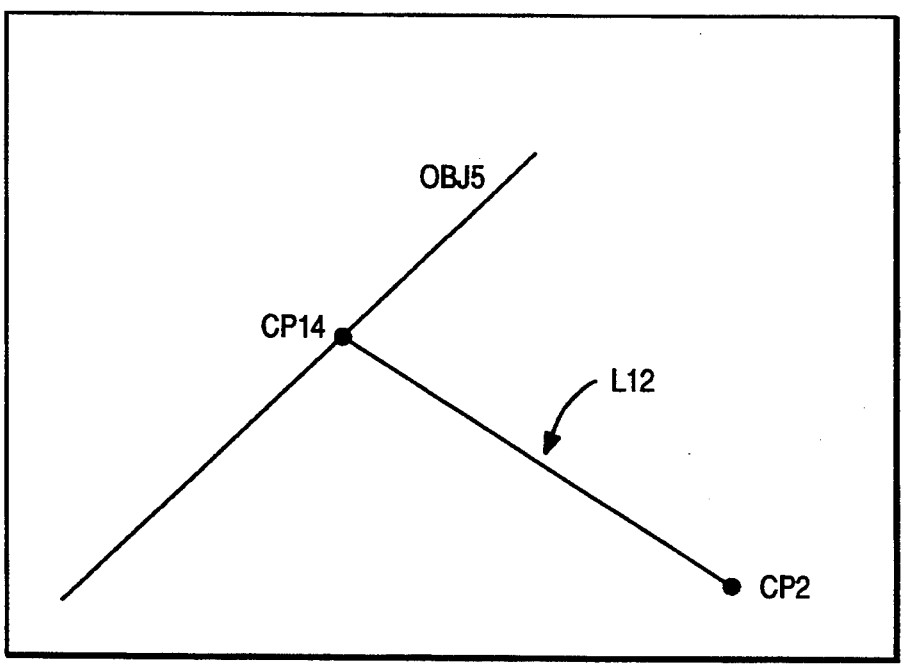
FIG. 31 is a view showing an example of how a secondary graphics object is made.

After steps LS-5 to LS-9 have been executed, the segment L12 connecting points CP14 and CP2, shown in FIG. 31, is displayed.

*A control point is set on the circumference of an existing circle.

Figure 32:
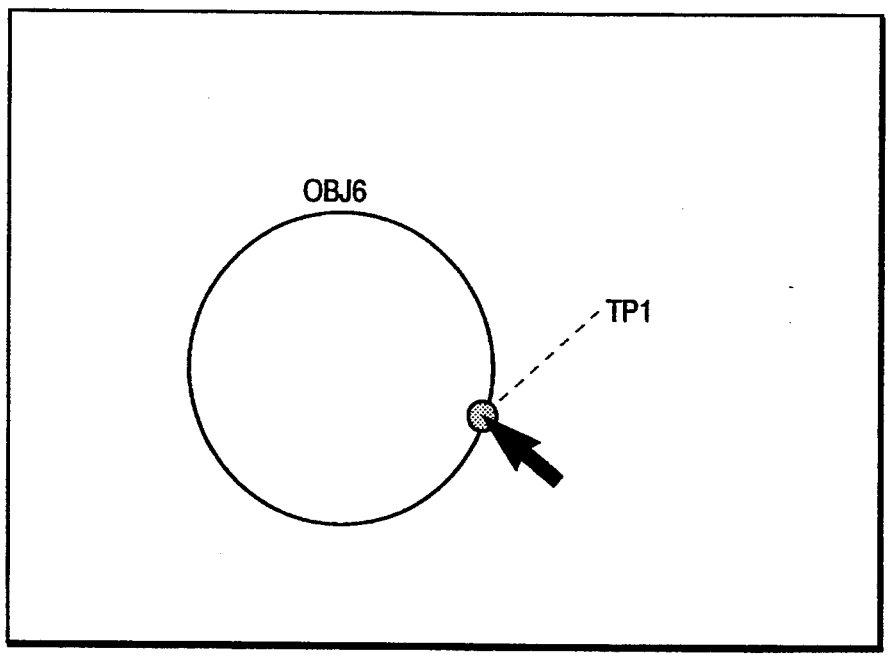
FIG. 32 is a view showing an example of how a secondary graphics object is made.

LS-2-4 TP1 is dragged with the mouse and placed on the circumference of a target existing circle, whose object number is OBJ6 (see FIG. 32).

LS-3-4-1 When the button (20) is clicked, the system enters the mode permitting the user to select a point on a circumference by using, for example, the means described in Japanese Patent Application 2-226812. The selected point is determined to be a new control point, and is given the number CP15.

LS-3-4-2 An angle that a 1 that a segment connecting the point on the circumference and the center makes with a horizontal line on the screen is calculated from the coordinates of the selected point on the circumference, the coordinates of the center, and the radius of the circle.

LS-4-4 The value cp-type-5 of the type of control point CP15 is registered as item 1. The coordinates of the point on the circumference are registered as item 2, the object number OBJ6 of the circle is registered as item 3, and angle theta 1 is registered as item 4 (see Table 4).

Figure 33:
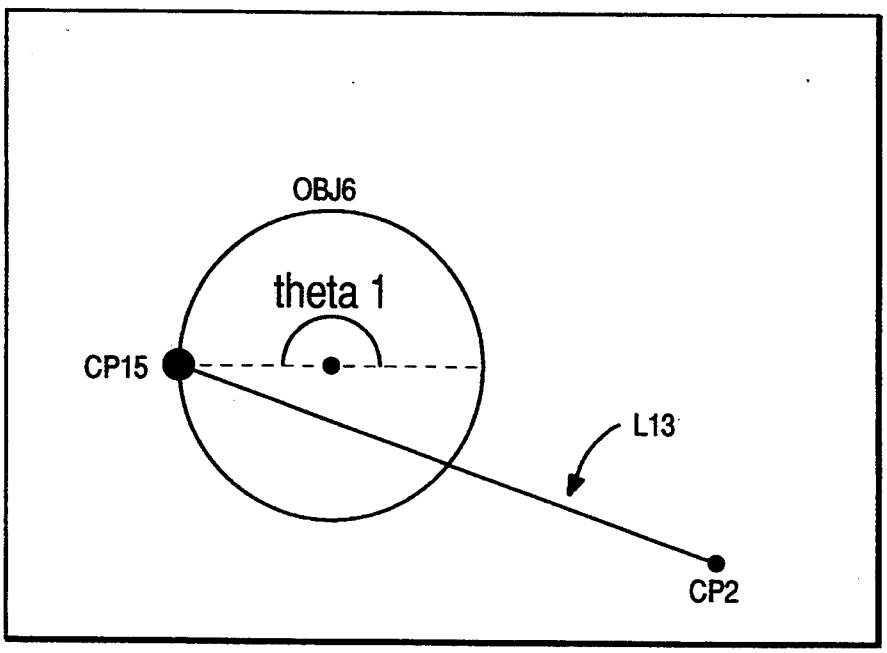
FIG. 33 is a view showing an example of how a secondary graphics object is made.

After steps LS-5 to LS-9 have been executed, the segment L13 connecting points CP15 and CP2, shown in FIG. 33, is displayed.

In this fashion, a graphics object (secondary graphics object) is drawn by setting control points on the vertices of existing graphics objects (primary graphics objects), the points of intersection of theses objects, the internal division points of segments, points on circumferences, or other points. Note here that distinction between primary graphics objects and secondary graphics objects is relative. For example, it is possible to generate a graphics object OB2 that is geometrically constrained by graphics object OB1 and further to generate a graphics object OB3 that is geometrically constrained by graphics object OB2. In this case, OB2 is a secondary graphics object relative to OB1, but a primary object relative to OB3. Moreover, OB2 is a direct secondary graphics object of OB1, whereas OB3 is an indirect secondary graphics object of OB1.

Next, a method for redrawing a secondary graphics object in response to the reshaping or movement of a primary graphics object is described. Control points other than cp-type-1 defining a secondary graphics object have data on their positions relative to other graphics objects in the control point table. That is, as shown in Table 4, the numbers of primary graphics objects, the numbers of their control points, and so forth are registered as the control point items. The coordinate calculating unit (7) calculates the current coordinate values of the control points by using such data. If a primary graphics object is changed in position or shape and if any secondary graphics object is geometrically constrained by the primary graphics object, the secondary graphics object is deleted from the screen, the values of the control points in the control point table are updated, and the secondary graphics object is displayed again.

Figure 34:
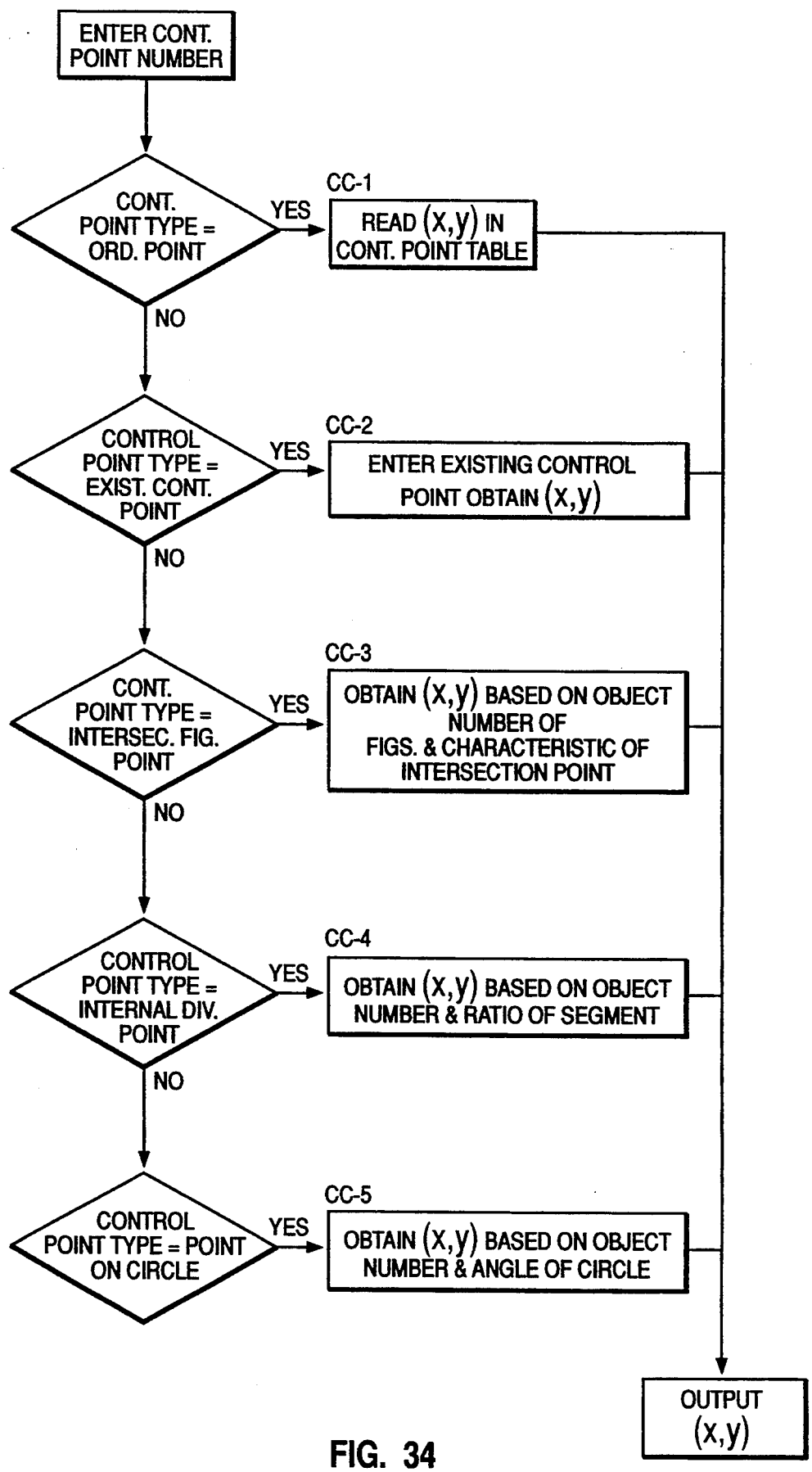
FIG. 34 is a flow chart showing the operation of a coordinate calculating unit.

FIG. 34 shows the procedure by which the coordinate calculating unit (7) calculates the coordinates of control points according to their type. When a control point number is entered, the coordinate calculating unit (7) obtains, from the control point table, knowledge on the type of the control point that has the entered number, and calculates and outputs its current coordinate values by a method determined by its type.

CC-1 If the control point type is "ordinary point on the screen" (CP11 in Table 4):

The coordinate values in item 2 for the control point are output unchanged.

CC-2 If the control point type is "existing control point" (CP12 in Table 4):

The "number of existing control points" in control point item 3 is entered again into the coordinate calculating unit, and its coordinate values are obtained. These values are output and also registered as control point item 2.

CC-3 If the control point type is "point of intersection existing graphics objects" (CP13 in Table 4):

The object numbers of the two intersecting graphics objects are registered as control point items 3 and 4. First, the two control points defining the graphics object that has the graphics object number in control point item 3 are obtained by consulting the graphics object table. Their current coordinate values (xp1, yp1) and (xp2, yp2) are calculated by using the coordinate calculating unit recursively. Similarly, the two control points defining a graphics object that has the graphics object number in control point item 4 are obtained, and their current coordinate values (xq1, yq1) and (xq2, yq2) are calculated. The different steps are executed in accordance with the types of the intersecting graphics objects.

i) If both the intersecting graphics objects are segments:

(xp1, yp1) and (xp2, yp2) are the coordinate values of the ends of one segment, and (xq1, yg1) and (xq2, yq2) are the coordinate values of the ends of the other. The solutions of the simultaneous equations given below are the coordinate values to be obtained. The obtained coordinate values are output and also registered as control point item 2.

$$(yp1 - yp2)*x + (xp2 - xp1)*y + (xp1*yp2 - xp2*yp1) = 0$$

... equation of a segment appearing in control point item 3

$$(yq1 - yq2)*x + (xq2 - xq1)*y + (xq1*yq2 - xq2*yq1) = 0$$

... equation of a segment appearing as control point item 4

(ii) If the intersecting graphics objects are a segment and a circle:

The graphics object appearing in control point item 3 is assumed to be a segment, whereas the graphics object appearing in control point item 4 is assumed to be a circle. (xp1, yp1) and (xp2, yp2) are the coordinate values of the ends of the segment, (xq1, yq1) are the coordinate values of the center of the circle, and (xq2, yq2) are the coordinate values of a point on the circumference. The solutions of the simultaneous equations given below are the coordinate values to be obtained. The obtained coordinate values are output and also registered as control point item 2. At this time, a calculation and a decision on which of the two obtained pairs of coordinates should be chosen are carried out by the intersection point identifying unit (90). Specifically, the coordinate values of the two ends of the segment, the coordinate values of the center of the circle, the radius of the circle, and the characteristic value in control point item 5 corresponding to the intersection point are entered into the intersection point identifying unit (90), and the coordinate values to be obtained are then output.

$(yp1-yp2)*x+(xp2-xp1)*y+(xp1yp2-xp2*yp1)=0$

... equation of a segment appearing in control point item 3

$(x-xq1)2+(y-yq1)2=r**2$

... equation of a circle appearing in control point item 4 where $r=sqrt((xq2-xq1)2+(yq2-yq1)2)$ iii) If the intersecting graphics objects are a segment and a circle:

The procedure is the same as in (ii) except that the simultaneous equations of two circles are solved. In this case substantial processing is also executed by the intersection point identifying unit (90).

CC-4 If the control point type is "internal division point" (CP14 in Table 4):

The graphics object number of the segment to be divided is registered as control point item 3, and the ratio 1 of the internal division as control point item. The two control points defining the graphics object that has the graphics object number in control point item 3 are found by consulting the graphics object table. By using the coordinate calculating unit recursively, their recent coordinate values (xp1, yp1) and (xp2, yp2) are calculated. Using these, the current coordinate values of the internal division point are calculated from the equations given below, registered in item 2, and output. ps $x=xp1+(xp2-xp)*ratio1$ $y=yp1+(yp2-yp1)*ratio1$ CC-5 If the control point type is "point on a circle" (CP15 in Table 4):

The graphics object number of the circle has been registered as control point item 3, and the value of angle theta 1 as control point item 4. The two control points defining a graphics object that has the graphics object number in control point item 3 are obtained by consulting the graphics object table. By using the coordinate calculating unit recursively, their current coordinate values (xp1, yp1) and (xp2, yp2) are calculated. Using these, the current coordinate values of the internal dividing point are calculated from the equations given below, registered in item 2, and output.

$x=xp1+r*cos(theta1)$ $y=yp1+r*sin(theta1)$ where $r=sqrt((xp2-xp1)2+(yp2-yp1)2)$, (xp1, yp1) are the coordinate values of the center of the circle, and (xp2, yp2) are the coordinate values of a point on the circumference.

Figure 35:
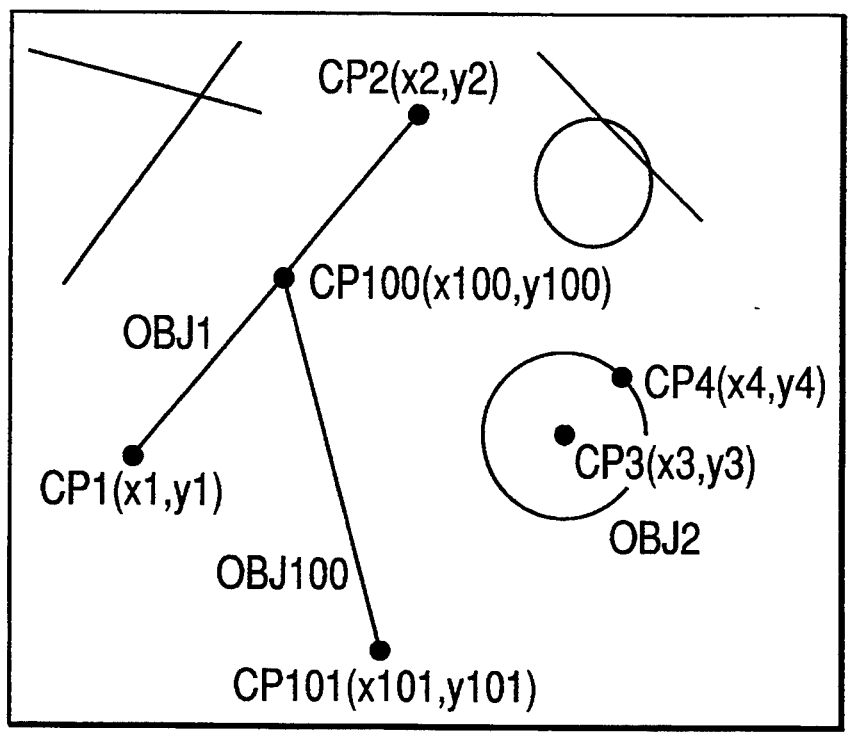
FIG. 35 is a view showing the display screen before a primary graphics object is reshaped.

The procedures for reshaping a primary object and for reshaping a secondary object in response are now explained. Objects OBJ1 and OBJ100 in FIG. 35 are taken as an example. Table 6 shows a graphics object table corresponding to FIG. 35, and Table 7 shows a corresponding control point table.

TABLE 6

| GRAPHICS OBJECT TABLE | | |
|---|---|---|
| Object Number | Type | Control Point Number |
| ... | ... | ... |
| OBJ1 | Segment | CP1, CP2 |
| ... | ... | ... |
| OBJ2 | Circle | CP3, CP4 |
| ... | ... | ... |
| OBJ100 | Segment | CP100, CP101 |

TABLE 7

| CONTROL POINT TABLE | | | | | |
|---|---|---|---|---|---|
| Control Point Number | Control Point Item 1 (type) | Control Point Item 2 (coordinate value) | Control Point Item 3 | Control Point Item 4 | Control Point Item 5 |
| ... | ... | ... | ... | ... | ... |
| CP1 | cp-type-1 | (x1, y1) | ... | ... | ... |
| ... | ... | ... | ... | ... | ... |
| CP2 | cp-type-1 | (x2, y2) | ... | ... | ... |
| ... | ... | ... | ... | ... | ... |
| CP3 | cp-type-1 | (x3, y3) | ... | ... | ... |
| ... | ... | ... | ... | ... | ... |
| CP4 | cp-type-1 | (x4, y4) | ... | ... | ... |
| ... | ... | ... | ... | ... | ... |
| CP100 | cp-type-4 | (x100, y100) | OBJ1 | ratio100 | ... |
| ... | ... | ... | ... | ... | ... |
| CP101 | cp-type-1 | (x101, y101) | ... | ... | ... |
| ... | ... | ... | ... | ... | ... |

Given below is an explanation of a case in which point CP1 in FIG. 35 is moved.

rs-1 When the user moves the mouse cursor to the vicinity of CP1 and presses the mouse button, one of the control points in the control point table, which includes the point designated by the mouse cursor in its control point effective range, is selected. The selected control point (CP1 in this case) is recognized as having been updated.

rs-2 When the user further moves the mouse cursor and presses the mouse button at a target position, the coordinate values (x1', y1') of the location currently designated by the mouse cursor are registered as item 2 of control point CP1.

rs-3 In response to the updating of the coordinate values of CP1 in the control point table, the redrawing process (FIG. 36) is started.

The redrawing process is started in response to a change in the coordinate values of at least one control point of cp-type-1, finds a graphics object at least one control point of which has had its coordinate values changed, and redraws this graphics object. In the redrawing process shown in FIG. 36, the case in which N=OBJ2 is explained. (In FIG. 36, N is the number of a graphics object, and n is the number of a control point that defines the graphics object.)

The graphics object table is first consulted, and it is found that OBJ2 is defined by control points CP3 and CP4 (ss-1). Next, information on the types of CP3 and CP4 is obtained from the control point table (ss-2). After this, it is determined whether CP3 and CP4 are cp-type-1. Since both CP3 and CP4 are cp-type-1 (ordinary points on the screen), they are not affected by a change of OBJ1. Therefore, since the circle (OBJ2) determined by these two points is not affected by such a change of OBJ1, step ss-4 and subsequent steps are skipped. That is, OBJ2 is not redrawn.

In the redrawing process, the case in which N is segment OBJ100 is explained. The graphics object table is first consulted, and it is found that OBJ100 is defined by control points CP100 and CP101 (ss-1). Next, information on the types of CP100 and CP101 is obtained from the control point table (ss-2). After this, it is decided whether CP100 and CP101 are cp-type-1. Here, CP100 is cp-type-4, and is a point geometrically related to the graphics object. Therefore, it is determined that it may be affected by a change in the position of graphics object OBJ1.

Here, since CP100 is a point directly related geometrically to graphics object OBJ1, it is certain that it will be affected by a change in the position of the latter. However, even if CP100 were a point directly related geometrically to another graphics object, it would still be possible for the graphics object to be a direct or indirect secondary graphics object relative to graphics object OBJ1. It should therefore be noted that, if the type of at least one control point is other then cp-type-1, the system proceeds to the next SS-4 to perform recalculation of the coordinate values of all control points.

In ss-4, the coordinate values of CP100 are calculated by the CC-4 function of the coordinate calculating unit by using geometric information on OBJ1 (i.e., coordinate data on CP1 and CP2) and ratio 100 (the value of the ratio). The coordinate values of CP101 are calculated by the CC-1 function of the coordinate calculating unit. Next, it is determined whether the coordinate values of any control point are changed. In the example, the coordinate values of CP100 have been changed to (x100', y100'). Therefore, item 2 for CP100 in the control point table is updated, and graphics object OBJ100 is then redrawn by using the updated coordinate value.

Figure 37:
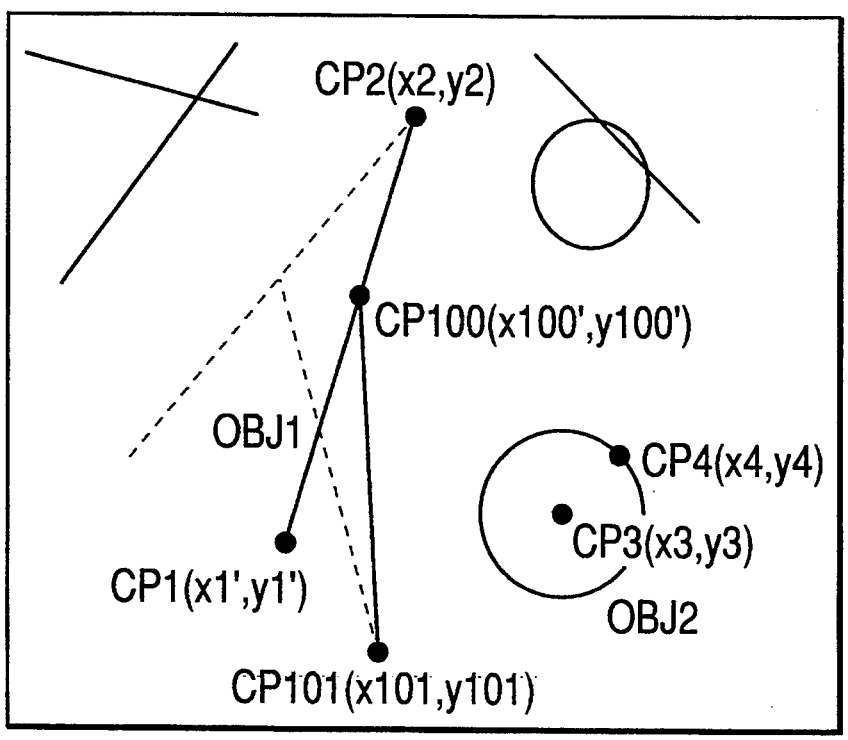
FIG. 37 is a view showing the display screen after a primary graphics object has been reshaped.

In the foregoing procedure, not only OBJ1, but also other graphics objects that have been generated under a geometrical constraint exerted directly or indirectly by OBJ1 can be redrawn so that they are affected by the change of OBJ1 (FIG. 37).

Figure 38:
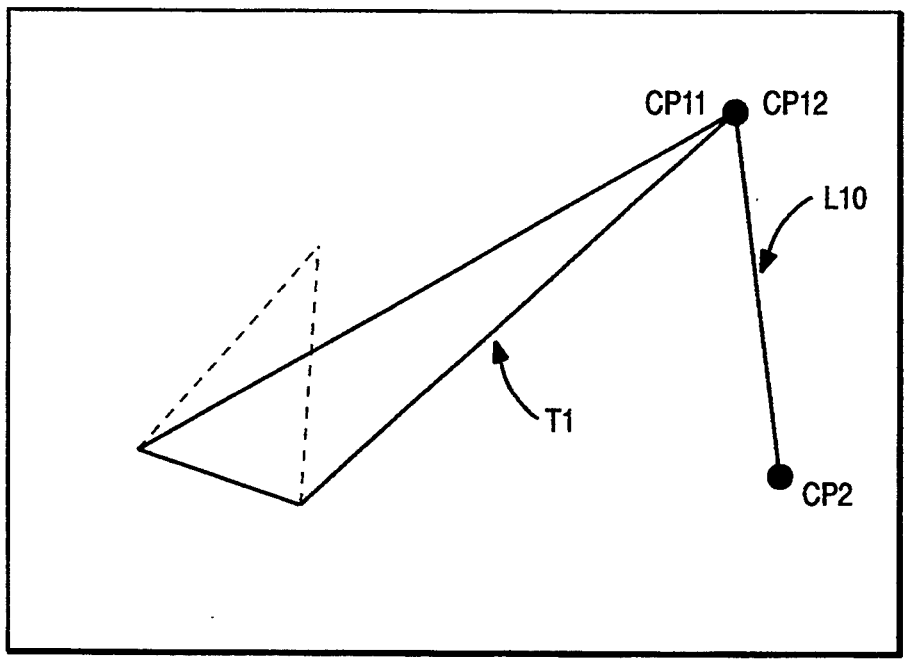
FIG. 38 is a view showing the display screen after a primary graphics object has been reshaped.
Figure 39:
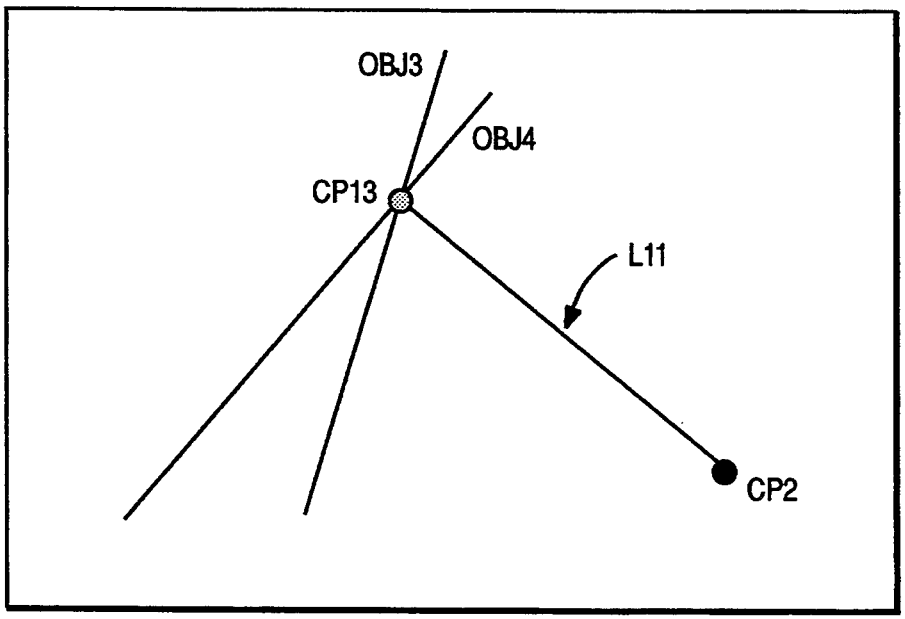
FIG. 39 is a view showing the display screen after a primary graphics object has been reshaped.
Figure 40:
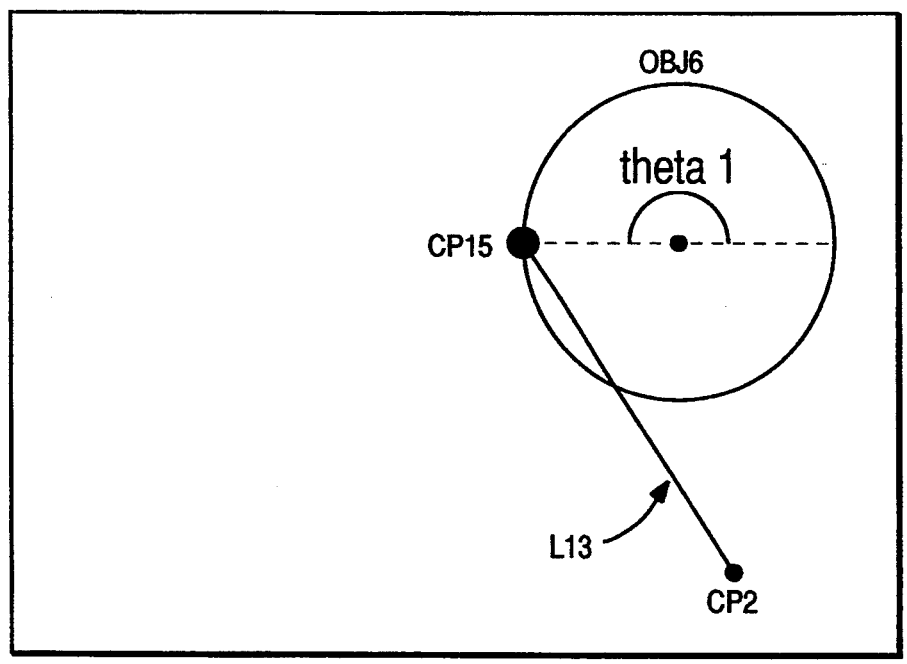
FIG. 40 is a view showing the display screen after a primary graphics objects has been moved.

If the same procedure as for the redrawing process is followed, segment L10 is re-displayed in response to the reshaping of triangle T1 in FIG. 16 (FIG. 38). Further, segment L11 is re-displayed in response to the reshaping of the segment (OBJ3) in FIG. 19 (FIG. 39), and segment L13 is re-displayed in response to the movement of the circle (OBJ6) in FIG. 33 (FIG. 40).

If the graphics object OBJ1 is translated, rotated, or scaled, the coordinate values of CP1 and CP2 in the control point table are updated simultaneously when a new position of object 1 is determined, and the coordinates of CP100 are then calculated and updated on the basis of the new coordinate values. The graphics object OBJ2 is reshaped to follow the movement of the graphics object OBJ1 by drawing a segment connecting CP100 and CP101, whose coordinates have been updated. Since a method for selecting a graphics object and editing it, such as translation, is known, its explanation is omitted.

Figure 36:
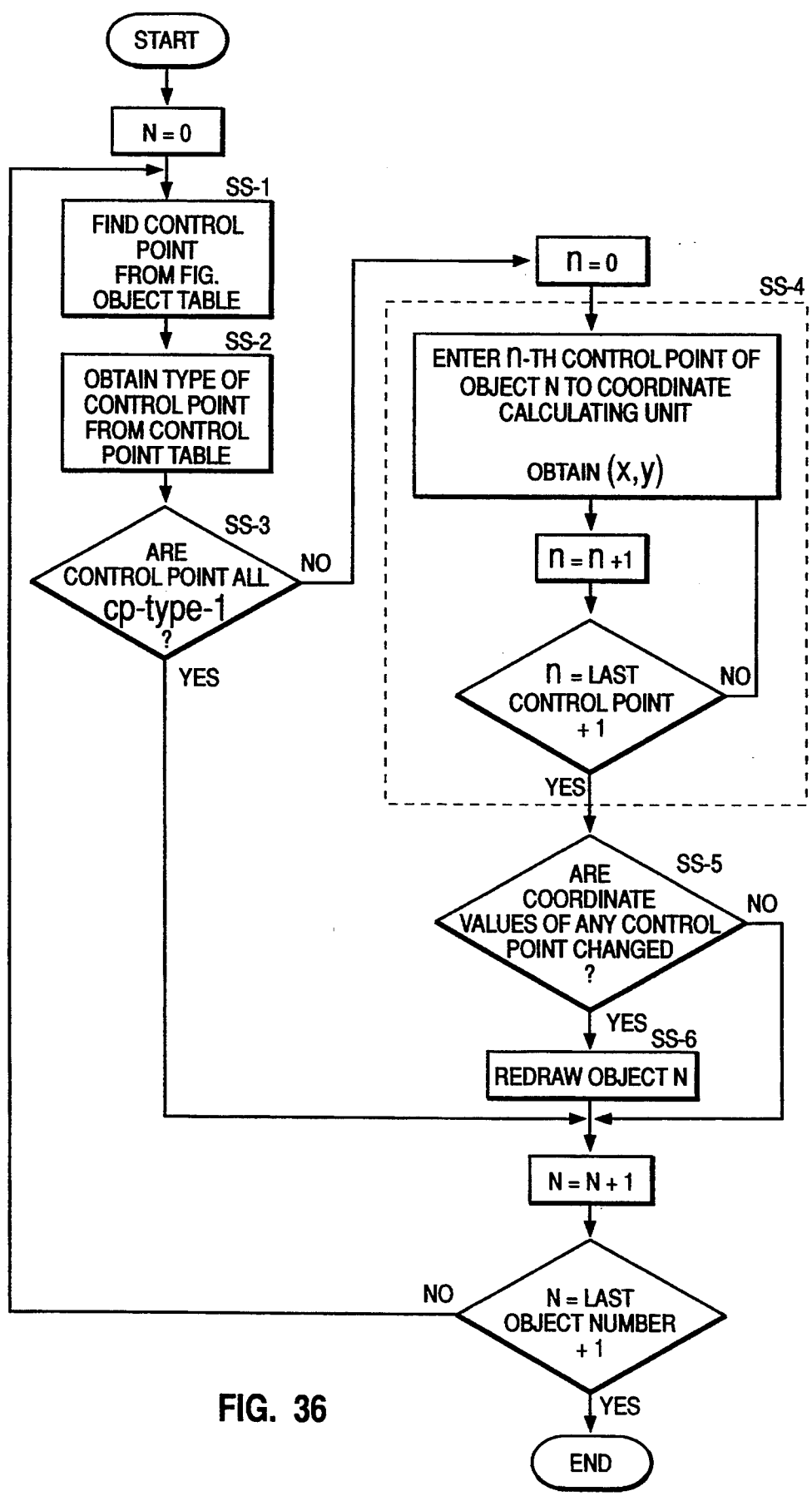
FIG. 36 is a flow chart showing the redrawing process.

Some variations may be employed for the coordinate calculating unit (FIG. 34) and the redrawing process (FIG. 36). For example, a step for determining whether the type of the control point is cp-type-1 may be added at the beginning of step ss-4, and coordinate calculations for cp-type-1 control points may be skipped. In this case, the coordinate calculating unit need not have the function cc-1.

Up to this point, the invention has been explained by using an embodiment for making and redrawing segments and circles. But the scope of the invention is not limited to these operations. Since straight lines or half-lines can be defined by two points on them, they can be generated and redrawn in the same way as a segment. Since points, polygons, quadratic curves other than circles, and three-dimensional solids can also be defined by using control points, the invention can be applied to them. For instance, in the case of a point, a graphics object is defined by a single control point. According to the invention, if the control point for a point graphic object is set on the midpoint of an existing segment, the segment is a primary graphic object and the point is a secondary graphic object. By describing the relationship between the segment and the control point in the control point table, the point can always be constrained to the midpoint of the segment. A plane in three-dimensional space in turn is defined by three points. According to the invention, if control points for the plane are set on the vertices of three cones and the relationships between the control points and the cones are described in the control point table, the plane can be redrawn in response to the movement of one or more cones.

Note also that the types of control points are not limited to those shown in Table 1. All the points in Table 1 except ordinary points on the screen are points located on existing graphics objects. A control point may be, although not located on an existing graphics object, geometrically related to that graphics object. One example of such a point is an external division point of a segment.

Furthermore, a unit for displaying a graphics object may be an apparatus other than a display, such as a printer. It is most preferable, however, to instruct an object to be reshaped or moved by using a mouse cursor on a display screen.

Finally, note that the invention is applicable regardless of the algorithm used for displaying graphics objects. A curve is generally approximated in a display by a continuous series of segments (see, for example, JA PUPA 2-250178). For this purpose, a table is provided for storing data on a continuous series of segments representing a graphics object.

EFFECT OF THE INVENTION

According to the invention, the data held on a control point geometrically constrained by a graphics object are not restricted to the coordinates of the point at which it is set.

Further, according to the invention, even when a number of graphics objects are interrelated, in response to the movement or reshaping of a graphics object, another graphics object generated under a geometrical constraint exerted directly or indirectly by it can be redrawn while maintaining the constraint relationship between them. In addition, such redrawing can be done in response to a movement or reshaping of a graphics object other than translation, rotation, and scaling.

I claim:

1. A graphic display system for generating one or more graphic objects, comprising:
   (a) a graphic object table for storing an identifier for the one or more graphic objects;
   (b) one or more control points for defining a particular graphic object;
   (c) a control point table for storing an identifier and positional data thereof for each control point;
   (d) means for updating the graphic object table and the control point table with modifications to control points in response to modifying the positional data of one or more control points on the graphic display; and
   (e) means for generating a new graphic object by storing in the control point table, the identifier of a previously defined control point in response to a user setting the control point.

2. A graphic display system as recited in claim 1, including means for displaying a graphic object.

3. A graphic display system as recited in claim 1, including means for providing help to a user.

4. A graphic display system as recited in claim 1, including means for generating identification data in the control table for an intersection point if a plurality of previously generated graphic objects are of a particular type of graphic objects.

5. A graphic display system as recited in claim 1, including means for updating a control point associated with a particular graphic object based on a user defined division of an existing graphic object.

6. A graphic display system as recited in claim 1, including means for updating a control point for a graphic object based on a line segment drawn at a particular angle relative to a point on the graphic object.

7. The graphics display system of claim 1 wherein the means for updating includes updating the graphic object table and the control point table with modifications to at least one control point of a first graphic object in response to modifying the positional data of one or more control points of a second graphic object on the graphic display.

8. A method for generating one or more graphic objects, comprising the steps of:
   (a) storing an identifier for the one or more graphic objects in a graphic object table in a data processing system;
   (b) defining a particular graphic object by generating one or more control points;
   (c) storing an identifier and positional data thereof for each control point in a control point table in a data processing system;
   (d) updating the stored graphic object table and the stored control point table with modifications to points in response to modifying the positional data of one or more control points on the graphic display; and
   (e) generating a new graphic object by storing in the control point table, the identifier of a previously defined control point in response to the a user setting the control point.

9. A method as recited in claim 8, including the step of displaying a graphic object on the graphic display.

10. A method as recited in claim 8, including the step of providing help to a user.

11. A method as recited in claim 8, including the step of generating identification data in the control table for an intersection point if a plurality of previously generated graphic objects are of a particular type of graphic objects.

12. A method as recited in claim 8, including the step of updating a control point associated with a particular graphic object based on a user defined division of an existing graphic object.

13. A method as recited in claim 8, including the step of updating a control point for a graphic object based on a line segment drawn at a particular angle relative to a point on the graphic object.

14. The method of claim 8 wherein the step of updating includes updating the stored graphic object table and the stored control point table with modifications to at least one control point of a first graphic object in response to modifying the positional data of one or more control points of a second graphic object on the graphic display.

* * * * *